(12) United States Patent
Kishi

(10) Patent No.: US 6,819,309 B1
(45) Date of Patent: Nov. 16, 2004

(54) DOUBLE-FACE DISPLAY DEVICE

(75) Inventor: Etsurō Kishi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 09/612,463

(22) Filed: Jul. 7, 2000

(30) Foreign Application Priority Data

Jul. 7, 1999 (JP) .......................................... 11-193681
Jul. 7, 1999 (JP) .......................................... 11-193682

(51) Int. Cl.$^7$ ............................................... G09G 3/36
(52) U.S. Cl. ........................ 345/87; 345/107; 359/296; 349/86; 349/88
(58) Field of Search .......................... 345/87, 107, 90; 359/296; 349/86, 88; 204/600

(56) References Cited

U.S. PATENT DOCUMENTS

| | | | | |
|---|---|---|---|---|
| 4,448,490 A | * | 5/1984 | Shibuya et al. | 349/82 |
| 4,857,907 A | * | 8/1989 | Koden | 349/140 |
| 5,238,861 A | * | 8/1993 | Morin et al. | 438/155 |
| 6,025,835 A | * | 2/2000 | Aoki et al. | 345/204 |
| 6,317,110 B1 | * | 11/2001 | Brandt | 345/87 |

FOREIGN PATENT DOCUMENTS

| | | |
|---|---|---|
| JP | 49-24695 | 3/1974 |
| JP | 2-265923 | 10/1990 |
| JP | 5-61024 | 3/1993 |

OTHER PUBLICATIONS

N.K. Sheridon, et al., "The Gyricon—A Twisting Ball Display", Proceeding of the S.I.D., vol. 18/3 & 4, pp. 289–293 (1977).

B. Comiskey, et al., "An Electrophoretic Ink for All–Printed Reflective Electronic Displays", Nature, vol. 394, pp. 253–255 (Jul. 16, 1998).

H. Yoshida, et al., "Reflective Display with Photoconductive Layer and Bistable Reflective Cholesteric Mixture", Journal of the S.I.D., vol. 5/3, pp. 269–274 (1997).

R. Service, "Patterning Electronics on the Cheap", Science, vol. 278, pp. 383–384 (Oct. 17, 1997).

P.M. Smith, et al., "Excimer Laser Crystallization and Doping of Silicon Films on Plastic Substrates", Appl. Phys. Lett., vol. 70, No. 3, pp. 342–344 (Jan. 20, 1997).

* cited by examiner

*Primary Examiner*—Jimmy H. Nguyen
(74) *Attorney, Agent, or Firm*—Fitzpatrick, Cella, Harper & Scinto

(57) ABSTRACT

A double-face display device is formed of a substrate sheet having a first surface and a second surface, a first display medium disposed over the first surface, a second display medium disposed over the second surface, and a first display electrode and a second display electrode disposed in association with the first display medium and the second display medium, respectively. A first switching device and a second switching device are electrically connected to the first display electrode and the second display electrode, respectively, so that voltages are applied to the first and second display electrodes via the first and second switching devices, respectively, thereby driving the first and second display media to display data on both faces of the display device. The production of the double-face display device is rationalized by disposing the first and second switching devices on a common surface within the display device. The common surface may be given by one of the first and second surfaces of the substrate sheet or an inter-layer surface between layer sheets forming the substrate sheet in a laminated form.

15 Claims, 16 Drawing Sheets

DOUBLE-FACE DISPLAY DEVICE

FIELD OF THE INVENTION AND RELATED ART

The present invention generally relates to a double-face (or both-face or two-face) display device wherein data is displayed an both faces, i.e., a front face and a back face, of the display device generally in the form of a sheet depending on voltages applied thereto.

In recent years, active proposals and development works have been suddenly reported on a paper-like display (device) in which data can be electrically written and which is conveniently portable like paper without requiring a storing power supply. It is expected that the paper-like display will be future data-storing and supply means capable of replacing paper medium such as newspaper, magazines and books predominant at present, and a form of very light data processing means carrying a home page browser.

Such a paper-like display device is at least required to satisfy functions equivalent to those of paper medium as follows:

(1) being thin, light in weight and portable like paper medium, (2) having a memory characteristic and not requiring a power supply for data storage, like paper medium, and (3) being inexpensive, like paper medium.

Incidentally, having a structure comprising plural sheets of paper media bound along an edge, a book has a characteristic of allowing the reader to acquire data on other pages in a short period by a simple operation of turning over the pages (without requiring a troublesome operation of sequentially displaying data by successive scrolling on a simple display screen as in a conventional display device or apparatus), easily understand the contents by reading forward and/or backwards by turning the pages as desired and easily have a new conception based on the acquired and understood contents. In order to utilize this characteristic of a book in a paper-like display device, it is desirable to bind plural sheets of paper-like display devices along an edge into a book-like form (which will be referred to as an "electronic book" hereinafter). In this case, the respective sheets of paper-like displays are caused to display a large volume of data downloaded from a data source. The above-mentioned functions (1) to (3) required of a paper-like display (device) are also important for realizing an electronic book by such paper-like displays.

Various proposals have been made on such a paper-like display, including the following as principal examples.

A microcapsule-type electrophoretic display (Nature, Vol. 394 [16], pp. 253–255, 1998), A minute ball rotation-type display (Proc. of the SID, Vol. 118, 3/4, pp. 289–293, 1977), and A cholesteric liquid crystal display (J. of SID, Vol. 5 [3], pp. 269–274, 1977).

Incidentally, in case where a display medium not having a clear threshold characteristic is used in such a paper-like display, it is desirable for the display to be driven according to an active matrix scheme. The active matrix scheme is currently predominantly adopted in a liquid crystal display device for notebook-type personal computers, etc., wherein each pixel is provided with a semiconductor switching device, such as a TFT or MIM, and voltages supplied to the respective pixels are controlled by the respective switching devices. This drive scheme has an advantage of obviating a crosstalk which is a problematic phenomenon encountered in the simple matrix drive scheme not having such switching devices at the respective pixels. As for methods of forming such switching devices, some proposals have been proposed as follows to form such switching device with an organic semiconductor material allowing the utilization of an inexpensive printing process instead of using inorganic semiconductors, such as amorphous silicon or polysilicon, incurring a high production cost, e.g., in Nature, Vol. 394 [16], pp. 253–255, 1998, J. in Proc. Materials Research Soc., B8.2, 1998, and Science, Vol. 279 [17], pp. 383–384, 1997.

There has been also proposed a double-face display device wherein data is displayed not only on a single face but on two major surfaces of a generally sheet-form display device, e.g., in the following a representative examples:

a device formed by bonding two liquid crystal panels back to back (JP-A 02-265923), and a polymer dispersion-type liquid crystal display device allowing independent displays on both surfaces of an intermediate supporting plate (JP-A 05-061024) as a proposal concerning a paper-like display.

FIG. 9 is a sectional view of a paper-like display (device) D6 disclosed in JP-A 05-061024 as an example of such a known paper-like display. The paper-like display D6 includes three substrates (or base plates) 1, 2 and 3 which are disposed in this order substantially parallel to each other and with prescribed gaps from each other. On respective surfaces of the central substrate (hereinafter called the "intermediate substrate") 2, display electrodes 4 and 5 and switching devices 6 or 7 are disposed, so that the display electrodes 4 and the switching devices 6 are electrically connected on one surface and the display electrodes 5 and the switching devices 7 are electrically connected on the other surface. Further, on the upper substrate 1 and the lower substrate 3, electrodes 20 and 21 are respectively disposed. Further, the two surfaces of the intermediate substrate 2 are respectively provided with control systems (not shown) so as to supply voltages to the display electrodes 4 and 5 via the switching devices 6 and 7, respectively, thereby allowing display of different data on both faces.

In the paper-like display D6 of the structure shown in FIG. 9, the intermediate substrate 2 is commonly used for two display faces, so that the total thickness and weight can be reduced to ½ to ¾ compared with a case where the same amount of data is disposed on two sheets of paper-like displays. Further, if a plurality of such double-face paper-like displays are formulated into an electronic book, it becomes possible to advantageously observe double-sized picture areas simultaneously in an open state.

However, in the above-described type of paper-like display D6, the switching devices 6 and 7 are disposed on both surfaces of the intermediate substrate 2 so that the switching devices are formed by repeating a switching device-formation step twice which incurs an increase in production cost. Further, switching devices 6 or 7 on either one surface have to be formed in a state where the switching devices 7 or 6 on the other surface have been already formed, so that the switching devices formed in advance are liable to suffer from process damage, such as thermal damage, during the latter forming step.

Further, the control systems are formed independently on both surfaces, thus incurring a correspondingly higher production cost.

SUMMARY OF THE INVENTION

Accordingly, a principal object of the present invention is to provide an inexpensive double-face display device.

According to the present invention, there is provided a double-face display device, comprising:

a substrate sheet having a first surface and a second surface, a first display medium disposed over the first surface, a second display medium disposed over the second surface, a first display electrode and a second display electrode disposed in association with the first display medium and the second display medium, respectively, and a first switching device and a second switching device electrically connected to the first display electrode and the second display electrode, respectively, so that voltages are applied to the first and second display electrodes via the first and second switching devices, respectively, thereby driving the first and second display media to display data on both faces of the display device, wherein the first and second switching devices are disposed on a common surface within the display device.

According to another aspect of the present invention, there is provided a double-face display device, comprising:

a substrate sheet having a first surface and a second surface, a first display medium disposed over the first surface, a second display medium disposed over the second surface, a first display electrode and a second display electrode disposed in association with the first display medium and the second display medium, respectively, and a first switching device and a second switching device electrically connected to the first display electrode and the second display electrode, respectively so that voltages are applied to the first and second display electrodes via the first and second switching devices, respectively, thereby driving the first and second display media to display data on both faces of the display device, wherein the substrate sheet has a laminated structure including a first layer sheet and a second layer sheet, and the first and second switching devices are disposed on a common surface between the first and second layer sheets.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

[First Embodiment]

Figure 1:
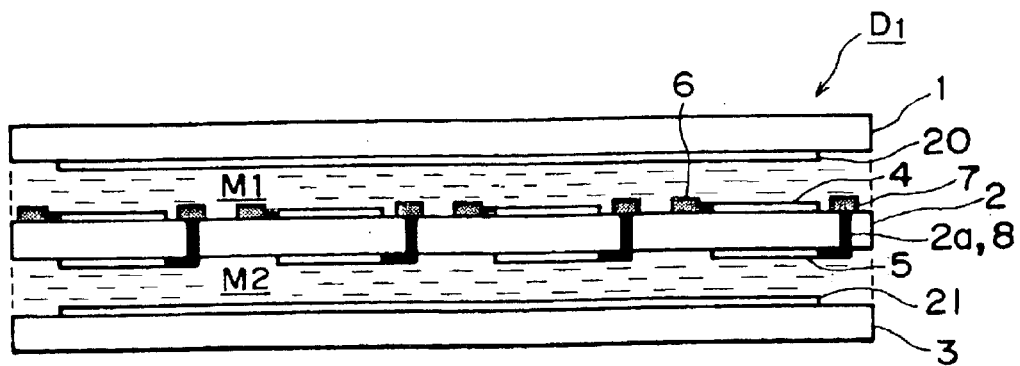
FIGS. 1, 2, 3, 5, 7, 10A, 10B, 10C, 11, 14 and 16 are respectively, a schematic thicknesswise sectional view of an embodiment of double-face display device according to the invention.

FIG. 1 is a sectional view of a double-face display device D1 according to the present invention. Referring to FIG. 1, the display device D1 includes an intermediate substrate sheet 2 having a first surface and a second surface (upper and lower surfaces in the figure), a first display, medium M1 and a second display medium M2 disposed over the first and second surfaces, respectively, first display electrodes 4 disposed on the first surface of the substrate sheet 2 and along the first display medium M1, first switching devices 6 electrically connected to the first display electrodes 4, second display electrodes 5 disposed on the second surface of the substrate sheet 2 and along the second display medium M2, and second switching devices 7 electrically connected to the second display electrodes 5, so that the first and second switching devices are disposed on the first surface of the substrate sheet 2. The double-face display device D1 may be driven by applying appropriate voltages to the first display electrode 4 via the first switching devices 6 and to the second display electrodes 5 via the second switching devices 7, thereby driving the first and second display media M1 and M2 to display data on both faces thereof.

As the display media M1 and M2, those used in known display devices as follows may be used:

a microcapsule-type electrophoretic display (Nature, Vol. 394 [16], pp. 253–255, 1998), a minute ball rotation-type display (Proc. of the SID, Vol. 118, 3/4, pp. 289–293, 1977), a cholesteric liquid crystal display (J. of SID, Vol. 5 [3], pp. 269–274, 1977), and a horizontal movement-type electrophoretic display (JP-A 49-024695).

Figure 2:
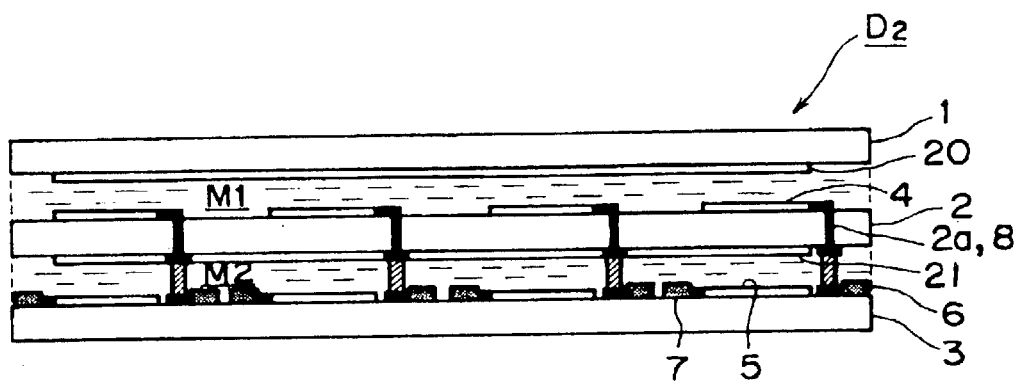

The first switching devices 6 and the second switching devices 7 may be disposed on either one of the first and second surfaces (the first surface in FIG. 1) of the substrate sheet 2 so as to be juxtaposed with each other. In more general term, the first switching devices 6 and the second switching devices 7 are disposed on a common surface given by any substrate constituting the display device. Such a common surface may be provided by, e.g., (a) the first surface of the substrate sheet 2 as shown in FIG. 1, (b) the second (lower) surface of the substrate sheet 2, or (c) one surface opposite to either the first or second surface of a pair of substrates 1 and 3 disposed to sandwich the intermediate substrate sheet 2 together with the display media M1 and M2 as shown in FIG. 2.

More specifically, the first display electrodes 4, the first switching devices 6 and the second switching devices 7 may be all disposed on one surface (first surface) of the switching sheet 2, and the second display electrodes 5 may be disposed on the other surface of the substrate sheet 2 as shown in FIG. 1. In this case, through-holes 2a may be formed in the substrate sheet 2, and connecting electrodes 8 may be formed at the through-holes 2a so that the second switching devices 7 and the second display electrodes 5 may be electrically connected via the connecting electrodes 8.

Alternatively, the second display electrodes 5, the first switching devices 6 and the second switching devices 7 may be disposed on the other (second) surface of the substrate sheet 2, and the first display electrodes 4 may be disposed on the first surface of the substrate sheet 2. In this case, through-holes 2a may be formed in the substrate sheet 2 and connecting electrodes may be formed at the through-holes 2a so that the first switching devices 6 and the first display electrodes 4 may be electrically connected via the connecting electrodes.

It is sufficient that the display electrodes 4 and 5 are disposed along (i.e., so as to apply voltages to) the first and second display media M1 and M2, respectively, and these electrodes need not be disposed on the substrate sheet 2. For example, these electrodes may be disposed on a common surface given by one of counter substrates 1 and 3 disposed opposite to the substrate sheet 2 and so as to sandwich the substrate sheet 2 together with the first and second display media M1 and M2.

Figure 4A:
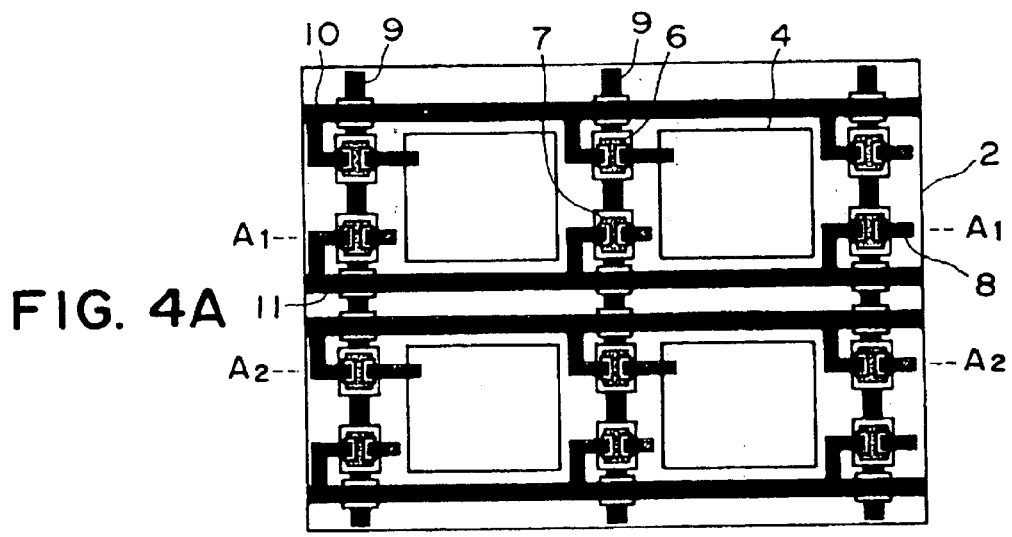
FIGS. 4A and 4D are top and bottom plan views of a substrate sheet 2 included in the device of FIG. 3, and FIGS. 4C and 4D are sectional views taken along line A1—A1 and A2—A2 respectively in FIG. 4A.
Figure 4B:
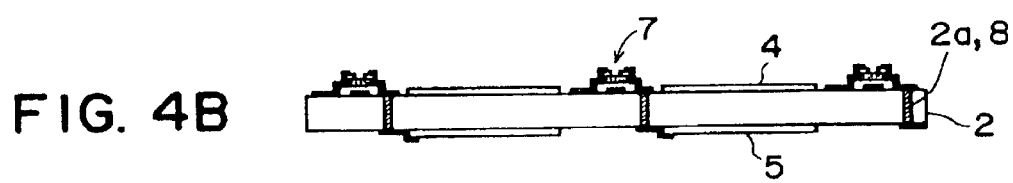
Figure 4C:
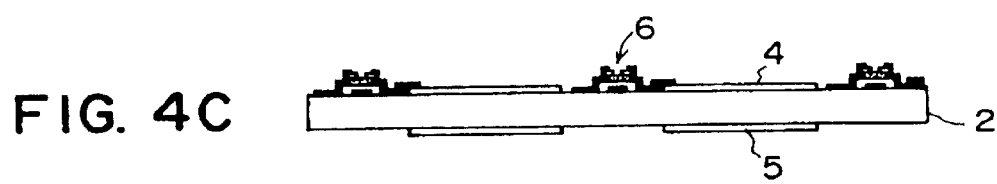
Figure 4D:
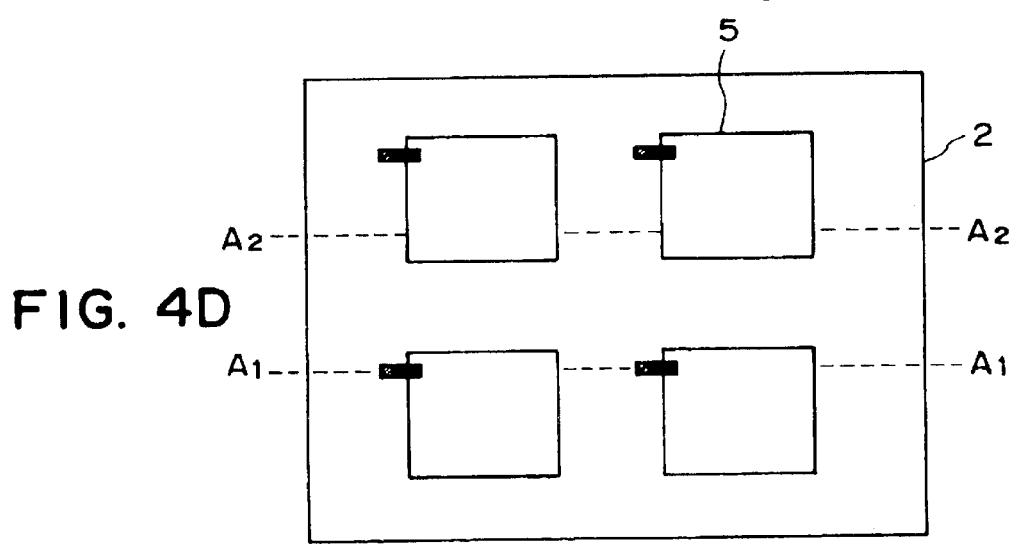

FIGS. 4A and 4D are top and bottom plan views of the substrate sheet 2, and FIGS. 4B and 4C are sectional views taken along lines A1—A1 and A2—A2 in FIG. 4A. As shown in FIG. 4A, the first switching devices 6 and the second switching devices 7 may be electrically connected to a scanning electrode drive circuit (not shown) via common scanning electrodes 9 so as to be supplied with prescribed voltages. Incidentally, one scanning electrode 9 can be connected to either one of the first switching devices 5 and the second switching devices 7 (not shown) or same of both the first switching devices 6 and the second switching devices 7 (i.e., a part of the first switching devices 6 and a part of the second switching devices 7) as shown in FIG. 4A.

Further, as shown in FIG. 4A, first data electrodes 10 may be connected to the first switching devices 6 and second data electrodes 11 may be connected to the second switching devices 7. These first and second data electrodes 10 and 11 may be connected to a common data electrode drive circuit (not shown) so as to be supplied with prescribed voltages.

The scanning electrodes 9 and the first and second data electrodes 10 and 11 are disposed on a common surface in the embodiment of FIGS. 4A–4D, but can also be disposed on different surfaces. These electrodes 9, 10 and 11 are disposed on a common surface where the first switching devices 6 and the second switching devices 7 are formed in the embodiment of FIGS. 4A–4D, but this is not essential. More specifically, these electrodes 9, 10 and 11 may be disposed (i) on the first surface (upper surface) of the substrate sheet 2 as shown in FIG. 4A, (ii) on the second surface (lower surface) of the substrate sheet 2, or (iii) on a surface of another substrate 1 or 3.

The substrates 1, 2 and 3 may be formed of a glass sheet or a flexible polymer sheet.

Each of the first and second switching devices 6 and 7 may for example comprise a film transistor device, such as a TFT, or an MIM-type switching device showing a non-linear diode characteristic. Incidentally, a flexible double-face display device may be realized by using a flexible polymer substrate sheet and forming thereon switching devices according to a method as proposed in reports, such as (i) Applied Phys., Lett., Vol. 70, No. 3, pp. 342–244, 1997,
(ii) SCIENCE, Vol. 282[17], pp. 383–384, 1997, and
(iii) J. in Proc. Materials Research Soc., B8.2, 1998.

More specifically, it may for example be possible to resort to a method of forming switching devices 6 and 7 of an inorganic material at low temperatures on a polymer switching sheet, e.g., by the laser annealing method, or a method of forming a layer of a polymeric material such as polyimide or polyaniline by printing, etc., are forming switching devices 6 and 7 on a polymer substrate, for providing a flexible polymer substrate allowing realization of a flexible double-face display device.

The display device of FIGS. 4A–4D may be modified as shown in FIGS. 8A through 8D wherein first charge storage capacitances 40 are connected to the first display electrodes 4 and second charge storage capacitances 41 are connected to the second display electrodes 5. These charge storage capacitances 40 and 41 may preferably be formed on a common surface by connecting at least one of the charge storage capacitances 40 and 41 to the above-mentioned display electrodes and scanning electrodes via the connecting electrodes formed at the through-holes. The charge storage capacitances 40 and 41 may preferably be formed on a surface which is different from the surface on which the first and second switching devices 6 and 7 are formed. Further, these charge storage capacitances 40 and 41 may preferably be formed at regions superposed with the regions where the first and second switching devices 6 and 7 are formed.

The above-mentioned device described with reference to FIGS. 1, 2, 4 and 8 respectively have a cell structure comprising an intermediate supporting substrate sheet, and two counter-substrate sheets disposed opposite to the intermediate substrate sheet on both sides thereof but the double-face display device of the present invention is not always required to have three substrate sheets. Alternatively, it is also possible to have a structure including one substrate sheet having on surface carrying switching devices for both surfaces, display electrodes on both surfaces, and layers of display media disposed over the display electrodes and each comprising, e.g., a microcapsule-type electrophoretic display medium, a polymer sheet-like medium such as a polymer dispersion-type liquid crystal medium or a solid laminate film of an organic EL device on which are further disposed a transparent drive electrode film and a protective film. An another example, the above-mentioned horizontal movement-type electrophoretic display device (JP-A 49-024695) may be formed not by using a counter substrate bonded to the supporting substrate sheet via a spacer but by forming a resinous cavity of silicone rubber, etc., integrally provided with partitioning walls for pixel by the replica method, etc. as a means for enclosing the migration medium liquid.

According to first embodiment described above, the first switching devices 6 and the second switching devices 7 can be formed through a single step, so that the production cost can be substantially reduced compared with the conventional device required to repeat such a relatively expensive step twice.

Further, as the two types of switching devices 6 and 7 can be produced simultaneously, so that a process damage as encountered through successive production steps in the conventional device can be obviated.

Further, if scanning electrodes 9 are commonly connected to some of the first switching devices 6 and the second switching devices 7, a scanning electrode drive control circuit can be commonly used for the first and second switching devices 6 and 7. This also results in a decrease in production cost compared with the case where the first switching devices 6 and the second switching devices 7 require separate drive control circuits.

Further, if the charge storage capacitances 40 and 41 are formed on a common surface, these capacitances may also be produced through a single step, thus also allowing a decrease in production cost. By disposing these charge storage capacitances 40 and 41 at region superposed with the first and second switching devices 6 and 7, the resultant display device is provided with increased areal efficiency and aperture ratio.

The present invention will be described more specifically based on Examples.

EXAMPLE 1

Figure 3:
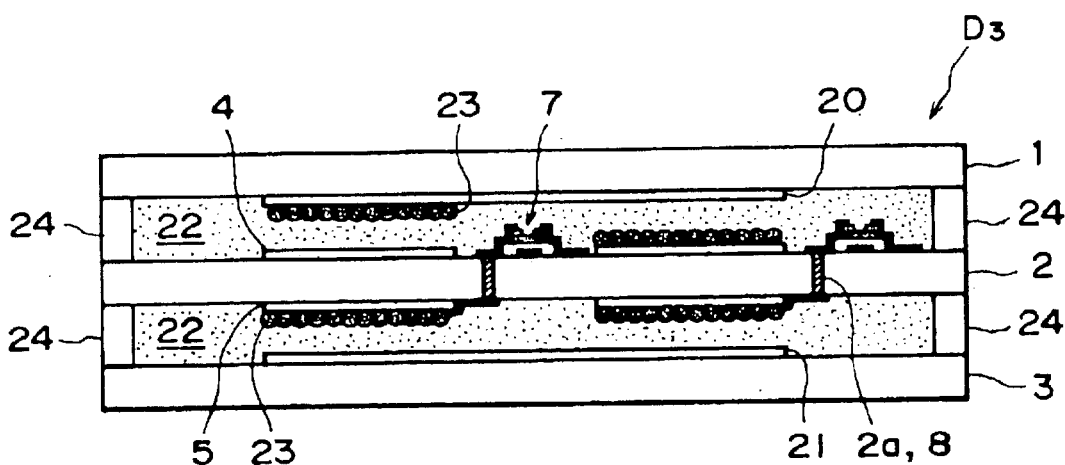

A double-face display device (electrophoretic display device) D3 having a structure as illustrated in FIGS. 3 and 4 was prepared.

As shown in FIG. 4A, first display electrodes 4, TFTs as first switching devices 6 for a first face display and TFTs as second switching devices 7 for a second face display, scanning electrodes 9, first data electrodes 10 and second data electrodes 11 were all formed on a first (upper) surface of an intermediate substrate sheet 2. Among these, the first display electrodes 4 were disposed at respective pixels, and in proximity to each display electrode (outside the pixel), one first-face TFT 6 and one second face TFT 7 were disposed. The scanning electrodes 9 were disposed in a number corresponding to pixel columns so as to run vertically (as seen in FIG. 4A) between the pixels, and the first and second data electrodes 10 and 11 were disposed in a number twice pixel columns so as to run laterally (as seen in FIG. 4A) between the pixels. On the other hand, second display electrodes 5 were disposed on a second (lower) surface of the intermediate substrate sheet 2 for respective pixels. Each of the display electrodes 4 and 5 was formed in a planar size of 300 $\mu$m×300 $\mu$m.

The intermediate substrate sheet 2 in a thickness of 75 $\mu$m was bored to form 20 $\mu$m-dia. through-hole 2a near the respective pixels, and the through-holes 2a were filled with connecting electrodes 8 connected to 40 $\mu$m-dia. circular pads.

The drain electrodes of the respective first-face TFTs 6 were connected to the first display electrodes 4, the source electrodes were connected to the first data electrodes 10, and the gate electrodes were connected to the scanning electrodes 9. On the other hand, of the respective second-face TFTs 7, the drain electrodes were connected to the second display electrodes 5 via the respective connecting electrodes 8 (FIG. 4B), the source electrodes were connected to the second signal electrodes 11, and the gate electrodes were connected to the scanning electrodes 9.

The surfaces of an upper substrate 1 and a lower substrate 3 opposite to the first and second surfaces, respectively, of the intermediate substrate sheet 2 were provided with a first common electrode 20 and a second common electrode 21, respectively, which were to be retained at a reference potential during drive.

Between the upper substrate 1 and the intermediate substrate sheet 2 and between the intermediate substrate sheet 2 and the lower substrate 3, display media M1 and M2 each comprising in mixture a colored liquid 22 and charged and colored electrophoretic particles 23 were disposed and sealed up with sealing members 24.

Thus, a display device D3 having 5×5 pixels for each face and including 5 scanning electrodes 9, 5 first data electrodes 10, and 5 second data electrodes 11 was prepared. The scanning electrodes 9 and the data electrodes 10, 11 were formed at a pitch of 350 $\mu$m and respectively in a width of 10 $\mu$m and a thickness of 300 $\mu$m.

The description of the process for preparing the display device D3 is supplemented below.

Both surfaces of the intermediate substrate sheet 2 of glass whitened by dispersion of $TiO_2$ were coated with a resist film. The resist film on the first (upper) surface of the substrate sheet 2 was selectively exposed in a pattern of the first display electrodes 4, the common scanning electrodes 9, and the electrode pads for the connecting electrodes 8, and the resist film on the second (lower) surface was selectively exposed in a pattern of the second display electrodes 5 and the electrode pads.

These resist films on both surfaced of the substrate sheet 2 were developed to remove the exposed portions to form negative patterns (resist-free regions where electrodes were to be formed).

Than, the substrate sheet 2 was bored by a YAG laser to form 20 $\mu$m-dia. through-holes 2a at the parts for forming the electrode pads.

Then, both surfaces of the substrate sheet 2 were coated with an Al film by sputtering at the exposed parts and inner walls of the through-holes 2a as well as over the remaining resist films.

Then, an electroconductive paste (a resin paste with fine metal particles dispersed therein) was applied by printing over the through-holes 2a and was pushed into the through-holes 2a by a blade while an excess thereof was removed by the blade. Incidentally, an electroconductive paste containing carbon fine particles dispersed therein can be used alternatively, or an insulating resin paste can be used to fill the through-holes if an electrical connection through the through-holes can be ensured by the Al film deposited thereat. Further, the through-holes 2a can also be filled with such an electroconductive or insulating paste supplied throuh a nozzle or an electrode material by metal plating.

Then, the resist film pattern remaining on the substrate sheet 2 were removed from the substrate sheet 2 together with a portion of the Al film thereon by lifting-off to leave the Al pattern forming the first display electrodes 4, the common scanning electrodes 9, the connecting electrodes 8, the electrode pads, and the second display electrodes 5.

Then, portions of the scanning electrodes 9, on which TFTs 6 and 7 were formed and the data electrodes 10 and 11 were disposed in intersection therewith, were surface-anodized into $Al_2O_3$.

Thereafter, an insulating film of $Ta_2O_5$ was formed by sputtering over the electrodes on the first surface of the substrate sheet 2. (Instead of the sputtering, another method, such as plasma CVD process can also be used. The insulating layer can also be formed of $SiO_2$ or $SiN_x$).

Then, the insulating layer was successively coated with a layer of a (amorphous)-Si and an etching protection film of $SiN_x$ respectively by the plasma CVD process, followed by patterning of the etching protection film. Than, an $n^+$a-Si ohmic layer was formed and islands of a-Si were formed, followed by coating with a sputtered Cr film, which was then patterned into the drain electrodes, the source electrodes, and the first and second data electrodes 10 and 11. Then, the entirety of the first surface of the substrate sheet 2 was coated with an $SiN_x$ film as a passivation film.

Separately, the upper substrate 1 and the lower substrate 3 each of glass were coated on one surface each thereof with an ITO (indium tin oxide) film, followed by patterning into a common electrode 20 and a common electrode 21, respectively.

Then, these substrates 1, 2 and 3 were applied to each other with a spacing of 50 $\mu$m each together with spacers (not shown) disposed therebetween, and the spacings were filled with display media M1 and M2 each comprising white $TiO_2$ particles having an average particle size of 5 μm dispersed with a colored liquid of silicone oil dyed with a blue dye and sealed up with sealing members.

The thus-produced double-face display device D3 is driven in the following manner.

Picture data to be displayed on a first face and picture data to be displayed on a second face are supplied to a picture data processing circuit (not shown) and divided into m×n pixel data for each face.

Then, pixel data of 2n in number including first-face pixel data and second-face pixel data arranged alternatively corresponding to the first data electrodes 10 and the second data electrodes 11 are formed for each scanning electrode 9 and stored in a frame memory (not shown).

In this state, the scanning electrode drive circuit supplies a selection signal pulse voltage to a first common scanning electrode 9 and non-selection signal pulse voltages to the other (m−1) common scanning electrodes 9 via a timing circuit (not shown). As a result, all the TFTs 6 and 7 on the selected common scanning electrode 9 are turned on, and all the TFTs 6 and 7 on the other common scanning electrodes 9 are all turned off Then, in synchronism with the selection period, data signals corresponding to the first-column common scanning electrode 9 are supplied to the data electrode drive circuit, whereby pixel data are supplied to all the first and second data electrodes 10 and 11. As a result, at pixels along the first-column common scanning electrode 9, electrophoretic particles 23 are moved depending on voltages applied to the display electrodes 4, 5 and the common electrodes 20, 21.

By repeating the above-mentioned drive operation successively for the other common scanning electrodes 9, picture display on each display face is effected.

EXAMPLE 2

Figure 5:
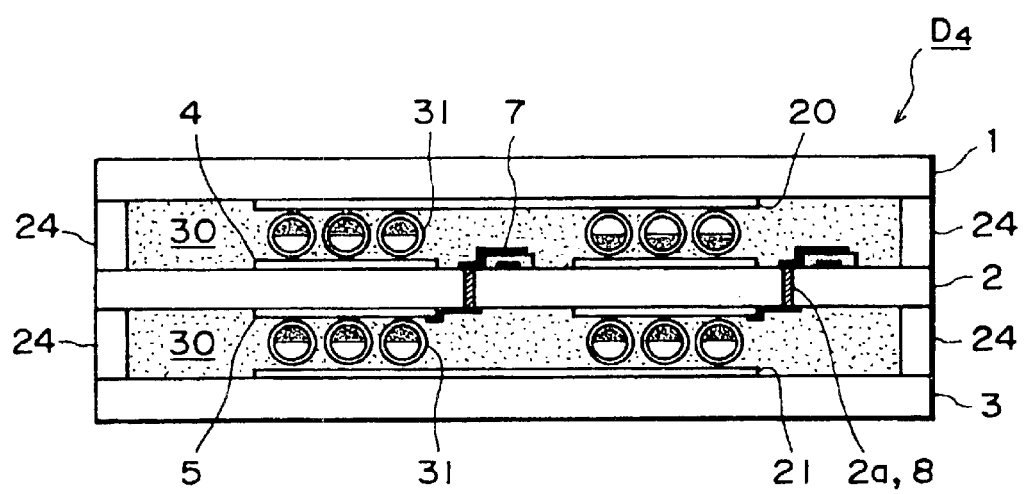
Figure 6A:
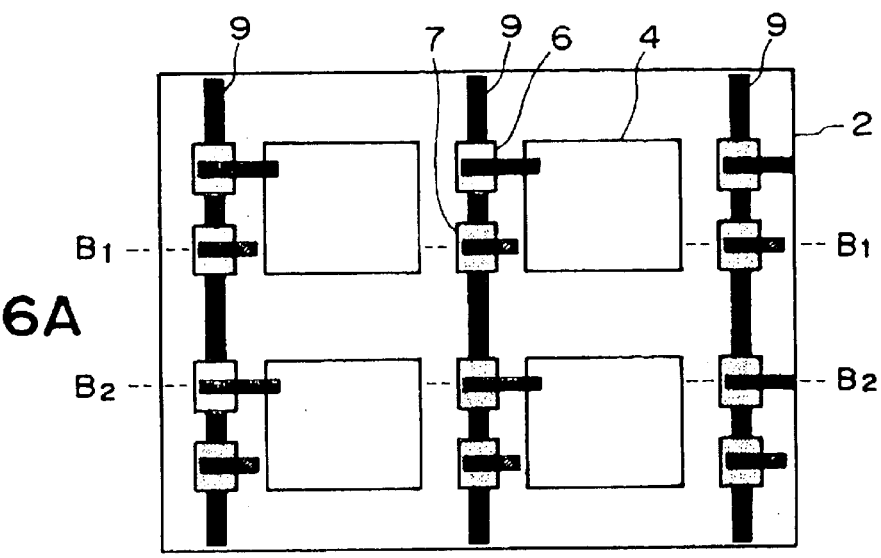
FIGS. 6A–6D and FIGS. 8A–8D respectively show a set of two plan views and two sectional views corresponding to FIGS. 4A–4D of display devices of FIGS. 5 and 7, respectively.
Figure 6B:
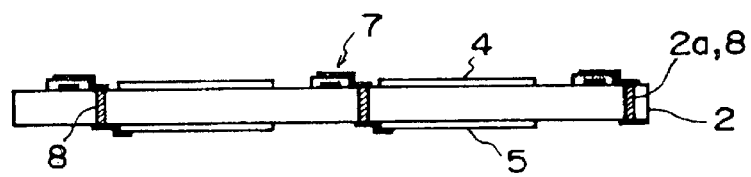
Figure 6C:
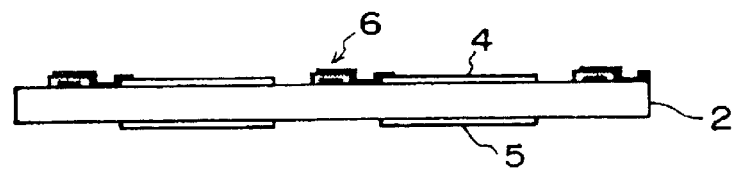
Figure 6D:
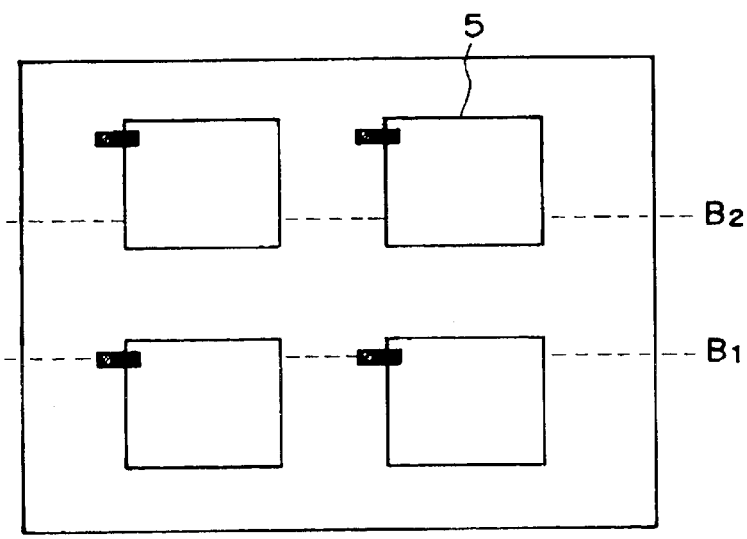

A double-face display device (minute ball twisting type display device) having a structure as illustrated in FIGS. 5 and 6 was prepared.

As first and second switching devices, MIM devices 6 and 7 were formed on a first (upper) surface of an intermediate substrate sheet 2, so that the upper electrodes or the MIM devices 6 were connected to the first display electrodes 4, an the upper electrodes of the MIM devices 7 were connected to the second display electrodes 5 on the second (lower) surface of the substrate sheet 2 via connecting electrodes 8 formed at through-holes 2a.

Between the substrates 1, 2 and 3, display media M1 and M2 each comprising a silicone rubber support layer 30 provided with cavities each enclosing a two-color ball 31 therein together with silicone oil as a lubricant for reducing a friction between the cavity wall and the two-colored ball.

The other structures of D4 were similar to those of D3 in Example 1.

The description of the process for producing the display device D4 is supplemented below.

Similarly as in Example 1, both surfaces of the intermediate substrate sheet 2 were coated with a resist film and subjected to pattern exposure. The exposed resist films on both surfaces were developed to form exposed electrode patterns including a pattern of scanning electrodes 9 on the first surface, and through-holes 2a were formed in the substrate sheet 2.

Then, both surfaces of the substrate sheet 2 were coated with a tantalum film by sputtering, and the through-holes 2a were filled with an electroconductive paste similarly as in Example 1.

Then, the first (upper) surface of the intermediate substrate sheet 2 was coated with a resist film, which was then patterned to be selectively removed at portions of the scanning electrodes 9 where the switching devices 6 and 7 were later formed, and the exposed portions of the scanning electrodes 9 were anodized to form a ca. 50 nm-thick $Ta_2O_x$ film. Then, a Cr film was formed thereover by sputtering and patterned to form the upper electrodes of the MIM devices 6 and 7, to complete the MIM devices 6 and 7. Then, the first (upper) surface provided with the MIM devices was coated with a passivation film similarly as in Example 1.

Separately, the upper substrate 1 and the lower substrate 3 were provided with common electrodes similarly as in Example 1.

Then, a minute ball rotation-type display device as proposed by N. K. Sheridan, et al (Proc. of the SID, Vol. 118, 3/4, pp. 289–293, 1977) was prepared. More specifically, a silicone rubber paste containing two-color balls of 50 μm in average diameter dispersed therein was applied over the first common electrode 20 and over the second common electrode 21 respectively in a thickness of 100 μm and cured, followed by dipping in silicone oil. As a result, the cured silicone rubber was swollen with the silicone oil, and the two color balls were separated from the silicone runner 30 to leave a minute gap which was simultaneously filled with the silicone oil. Finally, the substrates 1, 2 and 3 were applied to each other, and the peripheral parts of gaps between the substrates were sealed up with sealing members 24.

The display device D4 prepared in this Example may be driven in a similar manner as in Example 1. Each device is provided with a steep threshold characteristic owing to a nonlinear bilateral diode characteristic of the MIM devices 6 and 7. As a result, MIM diodes for selected pixels on a first column receiving a voltage above the threshold are placed in a low-resistivity on-state, while MIM diodes for non-selected pixels on the first column and the 2nd to m-th columns retain a high-resistivity off-state. As a result, the minute balls 31 at the respective pixels are rotated to prescribed positions depending on given picture data to provide a desired display state. Thereafter, the common scanning electrodes 9 are sequentially selected, and display states are written on both faces line by line for the scanning electrodes 9, to complete picture display on both faces.

EXAMPLE 3

Figure 7:
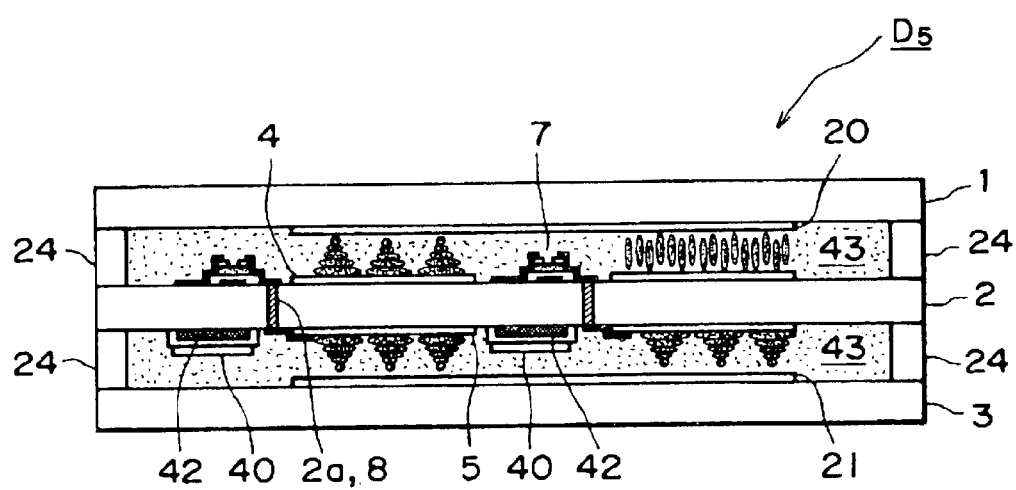
Figure 8A:
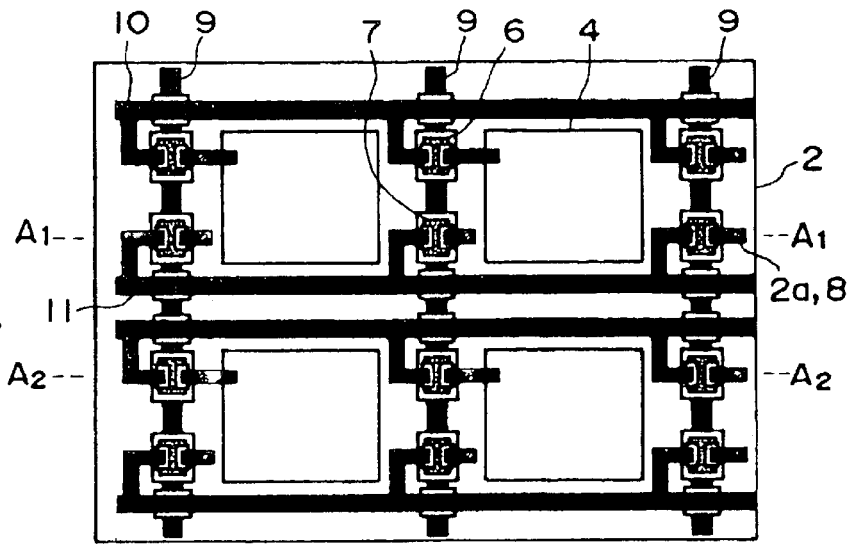
Figure 8B:
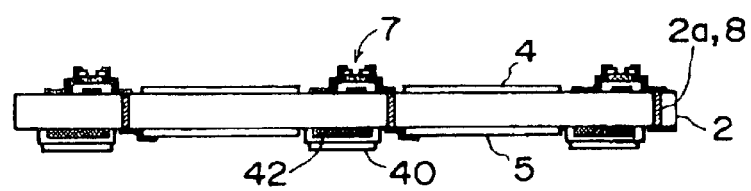
Figure 8C:
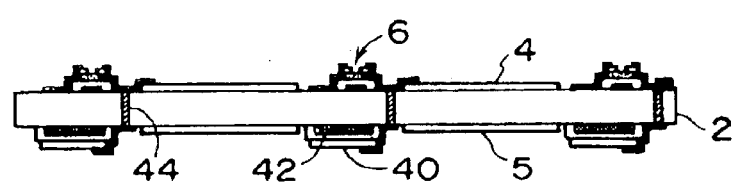
Figure 8D:
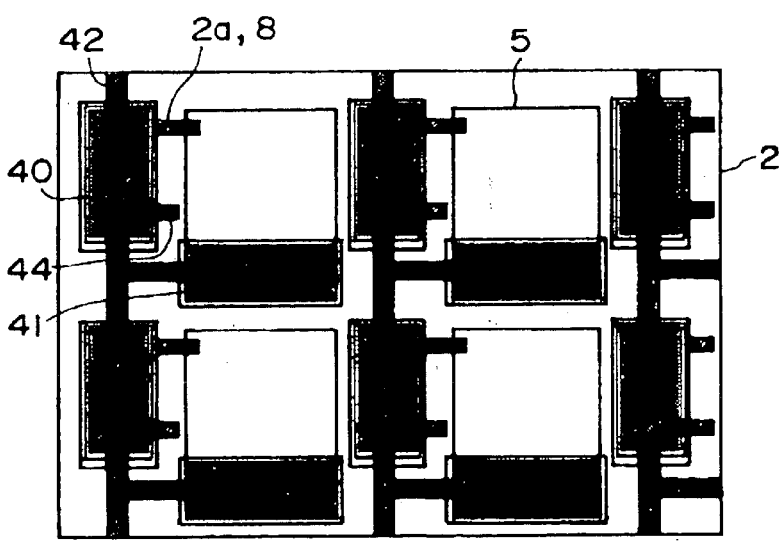
Figure 9:
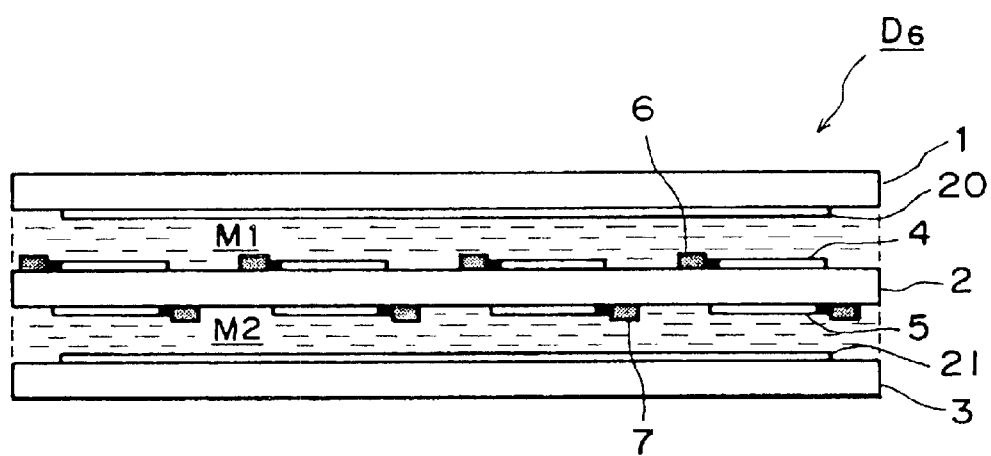
FIG. 9 is a schematic sectional view of a double-face display device prior to the invention.

A double-face display device (nematic liquid crystal display device) having a structure as shown in FIGS. 7 and 8 was prepared.

More specifically, similarly as in Example 1, first display electrodes 4, first-face TFTs (first switching devices) 6, second face TFTs 7 (second switching devices) 7, scanning electrodes 9, first data-electrodes 10 and second data electrodes 11, were all disposed on a first (upper) surface of an intermediate substrate sheet 2, and second display electrodes 5 were disposed on a second (lower) surface of the intermediate substrate sheet 2. However, unlike in Example 1, the second surface of the intermediate substrate sheet 2 was provided with first charge storage capacitances 40, second charge storage capacitances 41 and common electrodes 42 for charge storage capacitances 40 and 41 in addition to the second display electrodes 5. The second charge storage capacitances 41 were disposed below the second display electrodes 5, so that a portion of each second display electrode 5 functioned as an upper electrode for providing a charge storage capacitance. Further, the display electrodes 4 and 5 and the common electrodes 20 and 21 were respectively coated with a rubbed alignment control film (not shown). The substrates 1, 2 and 3 were applied to each other while leaving gaps therebetween, which were filled with a nematic liquid crystal (display medium) 43 in a uniformly twisted alignment state.

The other structures were similar to the device D3 in Example 1.

The description of the process for producing the display device D5 is supplemented below.

Similarly as in Example 1, both surfaces or the intermediate substrate sheet 2 were coated with a resist film and subjected to pattern exposure, followed by development for removal of the exposed portions of the resist film. Regarding the second (lower) surface of the substrate sheet 2, portions corresponding to the charge storage capacitances 40 and 41 and the common electrodes 42 for the charge storage capacitances of the resist film were also removed. Then, through-holes 2 were formed in a similar manner as in Example 1.

Further, similarly as in Example 1, Al films were formed on both surfaces of the substrate sheet 2 by sputtering, and the through holes were filled with an electroconductive paste.

Then, similarly as in Example 1, the resist films remaining on the intermediate substrate sheet 2 were removed together with portions of the Al films formed thereon by lifting-off to leave the first data electrodes 4, the common scanning electrodes 9, the connecting electrodes 8, the electrode pads and the second display electrodes 5.

Then, on the second (lower) surface of the intermediate substrate sheet 2, an intermediate insulating layer of $SIN_x$ forming a charge storage capacitance and a Cr film forming upper electrodes and wiring electrodes to the connecting electrode pads were formed and patterned by photolithography, sputtering and plasma CVD process.

Thereafter, TFTs 6 and 7 were formed similarly as in Example 1.

On the other hand, the upper substrate 1 and the lower substrate 3 were provided with common electrodes 20 and 21 in a similar manner as in Example 1 and were further coated with a polyimide alignment film (not shown), followed by rubbing.

These substrates 1, 2 and 3 were applied to each other with gaps each of 10 µm determined by spacers (not shown) disposed therebetween, an the gaps were filled with a nematic liquid crystal 43 (display medium), followed by sealing of a peripheral part by sealing members.

The double-face display device D5 of this example may be driven in a similar as in Example 1.

The disposition of the charge storage capacitances 40 and 41 in this Example is effective to provide an increased time constant of circuit formed by the liquid crystal and the capacitances 40 and 41, thereby delaying the attenuation of voltages applied to the display electrodes 4 and 5 and thus allowing a high contrast display.

Further, as the charge storage capacitances 40 are formed on the second surface at positions overlapping with the TFTs 6 and 7, the areal utilization efficiency is kept high to provide a good aperture ratio.

According to First embodiment, the first and second switching devices in charge of first-face display and second-face display are formed on a common surface within a double-face display device, so that these switching device can be formed through a single step whereby the production cost can be substantially reduced compared with a conventional device requiring two steps of switching devices.

As these two types of switching devices can be simultaneouses formed, the process damage of previously formed switching devices likely to be encountered in two-step production process can be obviated.

Further, as a scanning electrode can be commonly connected to some of first and second switching devices, a scanning electrode drive circuit can be commonly used for driving the first and second switching device, thus achieving a reduction of production cost compared with the case of providing separate scanning electrode control circuits for the first and second switching devices.

Further, by disposing a charge storage capacitance at a position overlapping with the first or second switching device, such a charge storage device can be provided while retaining a high aperture ratio of the display device.

[Second Embodiment]

Figure 10A:
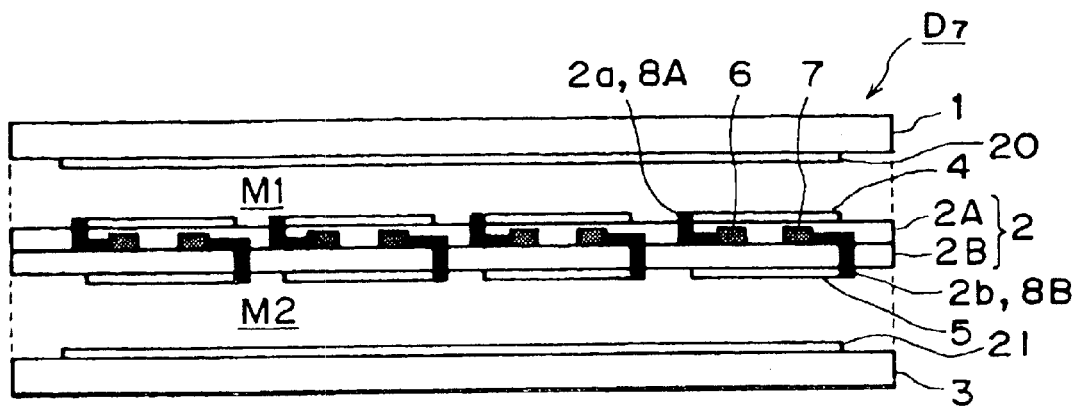

FIG. 10A is a sectional view of a double-face display device D7 according to the present invention. Referring to FIG. 10A, the display device D7 includes an intermediate substrate sheet 2 having a first surface and a second surface (upper and lower surfaces in the figure), a first display medium M1 and a second display medium M2 disposed over the first and second surfaces, respectively, first display electrodes 4 disposed on the first surface of the substrate sheet 2 and along the first display medium M1, first switching devices 6 electrically connected to the first display electrodes 4, second display electrodes 5 disposed on the second surface of the substrate sheet 2 and along the second display medium M2, and second switching devices 7 electrically connected to the second display electrodes 5.

Further, the substrate sheet 2 has a laminated structure including a first layer sheet 2A and a second layer sheet 2B, and the first switching devices 6 and the second switching devices 7 are disposed between the first and second layer sheets 2A and 2B. The double-face display device D7 may be driven by applying appropriate voltages to the first display electrodes 4 via the first switching devices 6 and to the second display electrode 5 via the second switching devices 7, thereby driving the first and second display media M1 and M2 to display data on both faces thereof.

As the display media M1 and M2, similar media as in First embodiment may be used.

The first switching devices 6 and the second switching devices 7 are disposed on a common surface between the first and second layer sheets. The common surface may be one of two mutually opposing surfaces of the first and second layer sheets, or a surface (of an additionally provided layer, such as a coating layer or film on either one of the first and second layer sheets) between the first and second layer sheets.

FIG. 10A (or 10C) shows a display device D7 (or D9) wherein the first and second switching devices 6 and 7 are formed on one surface of the second layer sheet 2B and embedded within the first layer sheet 2A.

Figure 10B:
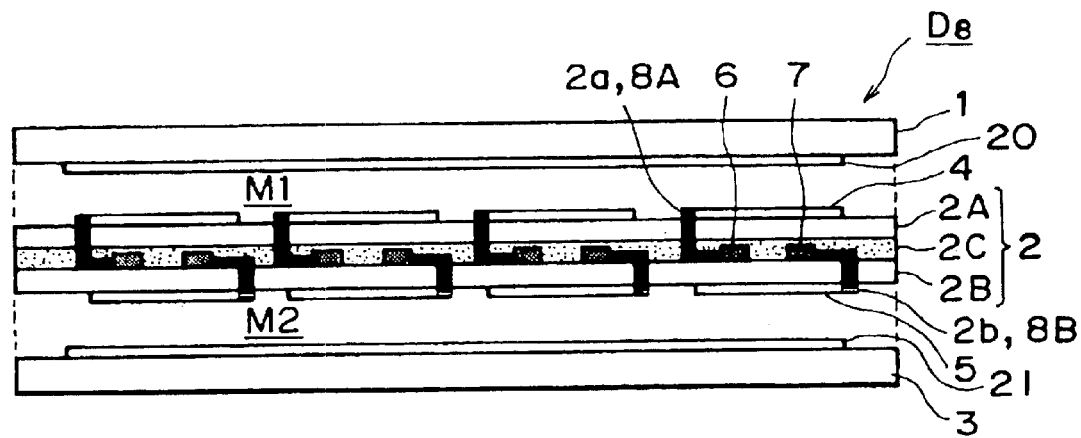

FIG. 10B shows a display device D8 wherein the first and second switching devices 6 and 7 are formed on one surface of a second layer sheet 2B of a substrate sheet 2 and embedded within an adhesive layer 2C used for applying a first layer sheet 2A onto the second layer sheet 2B.

Figure 12A:
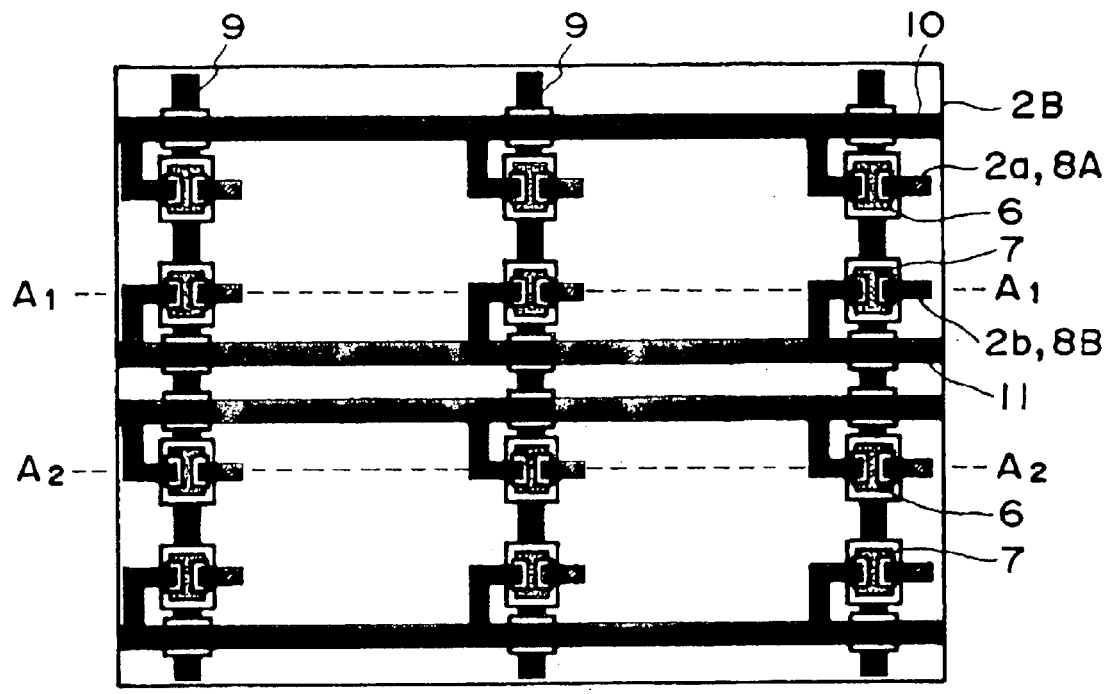
FIGS. 12A, 13A and 13B are three plan views as viewed in directions E1—E1, E2—E2 and E3—E3, respectively, in FIG. 11, and FIGS. 12B and 12C are sectional views taken along lines A1—A1 and A2—A2, respectively, in FIG. 12A.
Figure 12B:
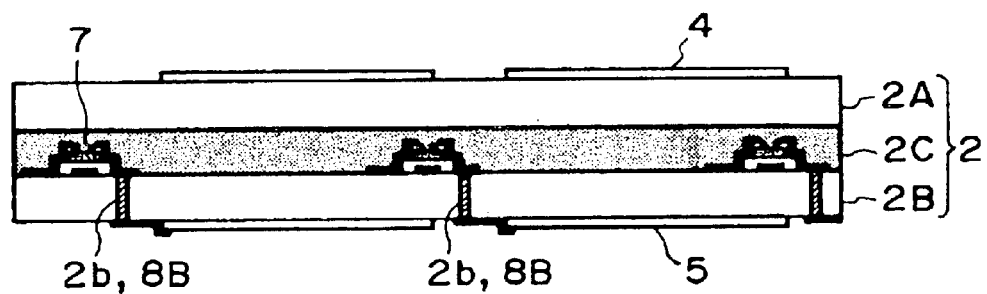
Figure 12C:
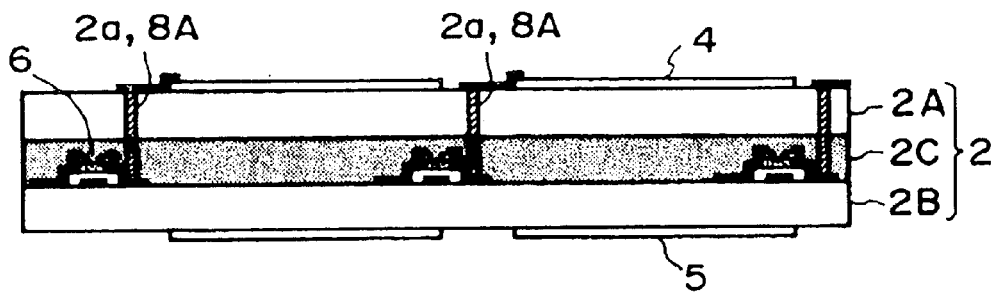

FIGS. 12A is a plan view of the second layer sheet 2B in the substrate sheet 2 in the display device D8 of FIG. 10B, and FIGS. 12B and 12C are sectional views taken along lines A1—A1 and A2—A2 in FIG. 12A. As shown in FIG. 12A, the first switching devices 6 and the second switching devices 7 may be electrically connected to a scanning electrode drive circuit (not shown) via common scanning electrodes 9 so as to be supplied with prescribed voltages for turning on and off the respective switching devices 6 and 7. Incidentally, one scanning electrode 9 can be connected to either one of the first switching devices 6 and the second switching devices 7 (not shown) or some of both the first switching devices 6 and the second switching devices 7 (i.e., a part of the first switching devices 6 and a part of the second switching devices 7) as shown in FIG. 12A. These scanning electrodes 6 may preferably be disposed between the first and second layer sheets 2A and 2B, e.g., on the second layer sheet 2B as shown in FIGS. 12A–12C. As a result, the planarity of the display faces due to a thickness of the scanning electrodes 9 can be obviated. If the scanning electrodes 9 are disposed between the first and second layer sheets in this way, the scanning electrodes 9 may be formed in a relatively large thickness of ca. 0.5–10 µm thicker then usual, thereby lowering the electrode resistance and suppressing the lowering in drive voltage along the scanning electrodes.

Further, as shown in FIG. 12A, first data electrodes 10 may be connected to the first switching devices 6 and second data electrodes 11 may be connected to the second switching devices 7. These first and second data electrodes 10 and 11 may be connected to a common data electrode drive circuit (not shown) so as to be supplied with prescribed voltages. These data electrodes 10 and 11 may preferably be disposed between the first and second layer sheets 2A and 2B, and on a common surface of either one of the first and second layer sheet 2A and 2B.

Figure 10C:
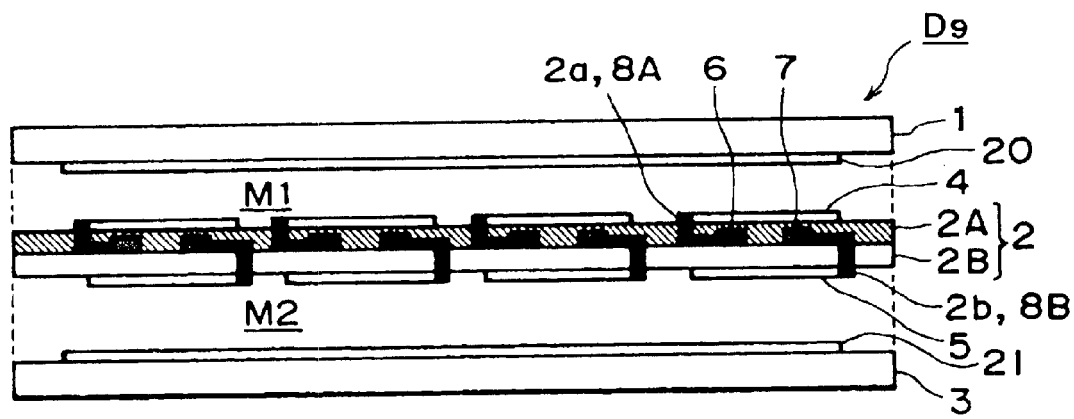

The first display electrodes 4 are formed on a first (upper) surface of the substrate sheet 2 in the embodiments of FIGS. 10A–10C, but this is not essential.

On the other hand, the first layer sheet 2A may be provided with through-holes 2a at which connecting electrodes 8A are formed, so that the first switching devices 6 are connected to the first display electrodes 4 via the connecting electrodes 8A. Similarly, the second layer sheet 2B may be provided with through-holes 2b at which connecting electrodes 8B may be formed, so that the second switching devices 7 may be connected to the second display electrodes 5 via the connecting electrodes 8B.

The substrates 1 and 3 may be formed of a glass sheet or a flexible polymer sheet.

On the other hand, the first layer sheet 2A and the second layer sheet 2B may respectively be formed of a glass sheet, or a film of plastic materials, such as polyethersulfone (PES) or polyethylene terephthalate (PET). It is further possible that one of the layer sheets 2A and 2B is formed of glass or such a plastic material, and the other is formed of a (cured or curable) resin material, such as acrylic resin, polysiloxane resin of urethane resin. A layer sheet of such a resin material may preferably be formed by applying a resin paste or two-liquid mixture type comprising a resin monomer and a polymerization initiator onto another layer sheet, followed by curing or hardening by thermal polymerization or photopolymerization. The two-liquid mixture type curable resin paste may be of the type of which polymerization is promoted by radicals generated on heating or radicals generated by irradiation with ultraviolet rays. One or both of these first and second layer sheets can be provided with a smoothening or flattening layer. These layer sheets need not have an identical area, but one layer sheet can be partially laminated with the other layer sheet.

These layer sheets may preferably be opaque. More specifically, it is preferred that at least one of the first and second layer sheets 2A and 2B and a possibly used adhesive layer 2C therebetween is opaque, or an additional opaque layer is included in a laminated structure providing the substrate sheet 2.

The first and second layer sheets are laminated to provide an intermediate substrate sheet 2 so that they may preferably be as thin as possible so as to provide a light-weight device as far as they exhibit a desired strength in the laminated state.

Each of the first and second switching devices 6 and 7 may for example comprise a film transistor device, such as a TFT, or an MIM-type switching device showing a non-linear diode characteristic similarly as described with reference to First embodiment. Also, a flexible double-face display device may be provided by using a flexible polymer substrate sheet and forming thereon switching devices according to a method as described with reference to First embodiment.

The display device (or substrate sheet therein) of FIGS. 12A–12D may be modified as shown in FIGS. 17A–17D wherein first charge storage capacitances 40 are connected to the first display electrodes 4 and second charge storage capacitances 41 are connected to the second display electrodes 5. These charge storage capacitances 40 and 41 may preferably be formed on a common surface between the first and second layer sheets 2A and 2B.

The above-mentioned devices described with reference to FIGS. 10, 12 and 17 respectively have a cell structure comprising an intermediate supporting substrate sheet, and two counter-substrate sheets disposed opposite to the intermediate substrate sheet on both sides thereof but the double-face display device of the present invention is not always required to have three substrate sheets. Alternatively, it is also possible to have a structure including one substrate sheet having one surface carrying switching devices for both surfaces, display electrodes on both surfaces, and layers of display media disposed over the display electrodes and each comprising, e.g., a microcapsule-type electrophoretic display medium, a polymer sheet-like medium such as a polymer dispersion-type liquid crystal medium or a solid laminate film of an organic EL device 1 on which are further disposed a transparent drive electrode film and a protective film. As another example, the above-mentioned horizontal movement-type electrophoretic display device (JP-A 49-024695) may be formed not by using a counter substrate bonded to the supporting substrate sheet via a spacer but by forming a resinous cavity of silicone rubber, etc., integrally provided with partitioning walls for pixel by the replica method, etc. as a means for enclosing the migration medium liquid.

A double-face display device (e.g., D7 shown in FIG. 10A) may be produced through a process including:

a step of providing a substrate sheet 2 having a first and a second surface, a step of disposing a first display medium and a second display medium in contact with the first surface and the second surface, respectively, of the substrate sheet 2, a step of disposing a first display electrode 4 so as to be along the first display medium, a step of disposing a second display electrode 5 so as to be along the second display medium, a step of electrically connecting a first switching device 6 to the first display electrode 4, and a step of electrically connecting a second switching device 6 to the first display electrode 4, and a step of electrically connecting a second switching device 7 to the second display electrode 5.

The process may include a step of laminating a first layer sheet 2A and a second layer sheet 2B to form the substrate sheet 2 so that the first and second switching devices are disposed on a common surface between the first and second layer sheets 2A and 2B.

In the case where the first and second layer sheets are formed of a glass sheet or a plastic film as mentioned above, the lamination of these layer sheets may for example be performed according to the following methods.

A method of forming a structure as illustrated in FIG. 10A wherein one (2A) of two layer sheets (2A and 2B) is softened under heating and laminated onto the other (2B), followed by cooling. (In this method, the one layer sheet (2A) may preferably be formed on a material having a lower softening temperature than the other layer sheet (2B), and they are laminated to each other at a temperature where only one layer sheet (2A) is softened.

A method of laminating the two layer sheets 2A and 2B with an adhesive layer to provide a structure as shown in FIG. 10B.

A method of forming a structure as shown in FIG. 10C wherein a curable resin material is applied as a layer onto a layer sheet (2B) and cured to provide a layer sheet (2A) in lamination with the layer sheet (2B).

According to Second embodiment, the first and second switching devices are disposed between a pair of first and second layer sheets constituting the substrate sheet 2 for double-face display. As a result, the first display electrodes 4 disposed along the first display medium can be individually disposed in larger areas on the substrate sheet 2 without being constrained by the disposition of the switching devices 6 and 7, whereby a larger aperture ratio is ensured.

Further, if the first switching devices 6 and the second switching devices 7 are disposed on a common surface, they can be formed through a single step, so that the production cost can be substantially reduced compared with the conventional device required to repeat such a relatively expensive step twice. Further, as the two types of switching devices 6 and 7 can be produced simultaneously, a process damage as encountered through successive production steps in the conventional device can be obviated.

Further, if scanning electrodes 9 are commonly connected to some of the first switching devices 6 and the second switching devices 7, a scanning electrode drive control circuit can be commonly used for the first and second switching devices 6 and 7. This also results in a decrease in production cost compared with the case where the first switching devices 6 and the second switching devices 7 require separate drive control circuits.

Further, if the charge storage capacitances 40 and 41 are formed on a common surface, these capacitances may also be produced through a single step, thus also allowing a decrease in production cost. By disposing these charge storage capacitances 40 and 41 at regions superposed with the first and second switching devices 6 and 7, the resultant display device is provided with increased areal efficiency and aperture ratio.

Some Examples of Second embodiment will be described below.

EXAMPLE 4

Figure 11:
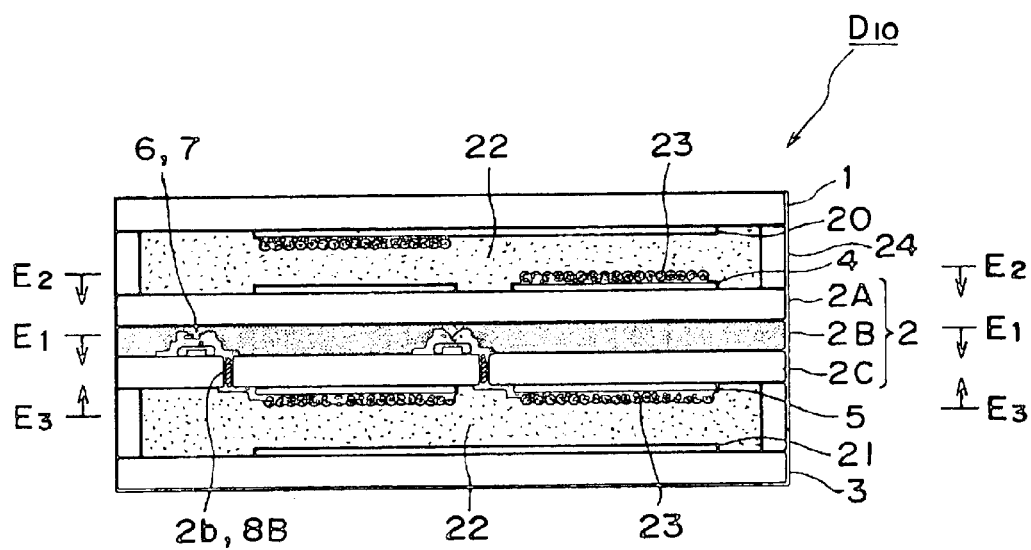

A double-face display device (vertical movement-type electrophoretic display device) D10 having a structure as illustrated in FIGS. 11–13 was prepared.

Figure 13A:
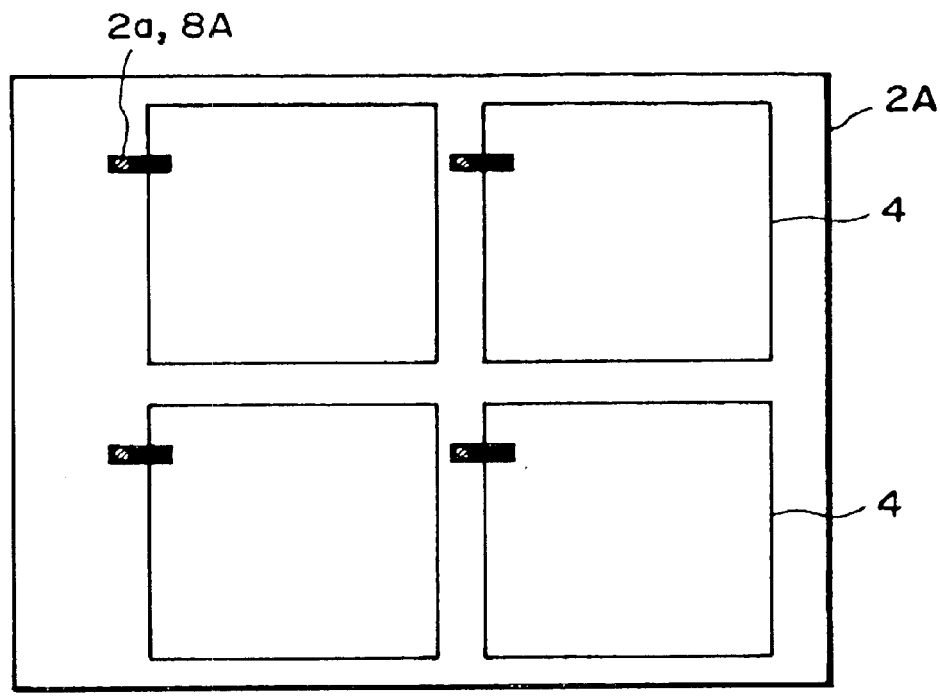
Figure 13B:
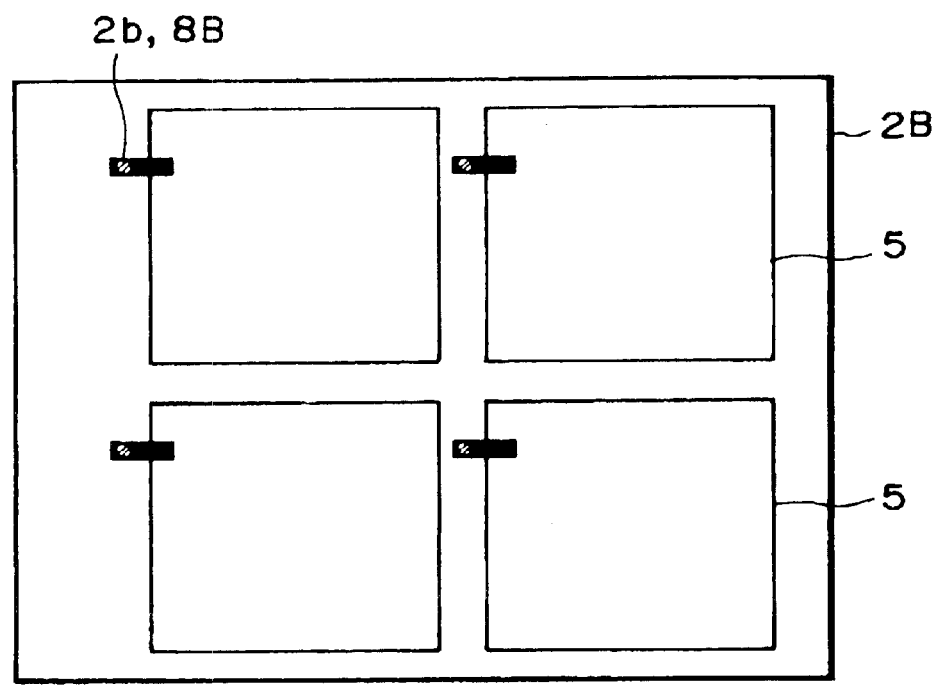

FIG. 11 is a sectional view of double-face display device D10 of this Example, FIG. 12A is a plan view as viewed in a direction of arrows E1—E1 in FIG. 11 for showing a device arrangement over a second (lower) layer sheet 2B; FIGS. 12B and 12C are sectional views of an intermediate substrate sheet 2 including the second layer sheet 2B taken along lines A1—A1 and A2—A2, respectively, in FIG. 12A; and FIGS. 13A and 13B are plan views as viewed in directions of arrow E2—E2 and E3—E3, respectively, in FIG. 11 for showing electrode arrangements on the first and second surfaces, respectively, of the substrate sheet 2.

More specifically, in this Example, a pair of an upper substrate 1 and a lower substrate 3 each of a glass sheet were disposed to sandwich an intermediate substrate sheet 2, which comprised a first layer sheet 2A of elastic film comprising polyethersulfone (PES) and a second layer sheet 2B of opaque white glass sheet containing $TiO_2$ dispersed therein bonded to each other with an adhesive layer 2C.

Further, as more specifically shown in FIG. 12A, first-face TFTs (first switching devices) 6, second-face TFTs (second switching devices) 7, scanning electrode 9, first data electrodes 10 and second date electrodes 11 were all formed on a first (upper) surface of the white glass layer sheet 2B. Incidentally, each pixel defined by one segment of display electrode (4 or 5) was provided with one TFT 6 for first-face display or one TFT 7 for second-face display, disposed in proximity thereto. The scanning electrodes 9 were disposed in a number corresponding to pixel column so as to run vertically (as seen in FIG. 12A) between the pixels, and the first and second data electrodes 10 and 11 were disposed in a number twice pixel column so as to run laterally (as seen in FIG. 12A) between the pixels. On the other hand, second display electrodes 5 were disposed on a second (lower) surface of the intermediate substrate sheet 2 for respective pixels.

Thus, a display device D3 having 5×5 pixels for each face and including 5 scanning electrodes 9, 5 first data electrodes 10, and 5 second data electrodes 11 was prepared. The scanning electrodes 9 and the data electrodes 10, 11 were formed at a pitch of 350 $\mu$m and respectively in a width of 10 $\mu$m and a thickness of 300 $\mu$m.

The first display electrodes 4 were disposed at respective pixels on an upper surface the plastic film layer sheet 2A in a matrix form as shown in FIGS. 11 and 13A, and the second display electrodes 5 were disposed at respective pixels on a lower surface of the white glass layer sheet 2B in a matrix form as shown in FIGS. 11 and 13B. Each of the first display electrodes 4 and second display electrodes 5 was formed in a planar size or 300 $\mu$m×300 $\mu$m.

Further, as shown in FIG. 12B, through-holes 2b were formed in the glass sheet 2B and filled with connecting electrode 8B each in a diameter of 20 $\mu$m and terminated with circular connection electrode pads each in a diameter of 40 $\mu$m.

The drain electrode of each first-face TFT 6 was connected to a first display electrode 4 via a connecting electrode 8A, and the drain electrode of each second-face TFT 7 was connected to a second display electrode 5 via a connecting electrode 8B. Further, the source electrode and the gate electrode of each first-face TFT 6 were connected to a first date electrode 10 and a scanning electrode 9, respectively. The source electrode and the gate electrode of each second-face TFT 7 were connected to a second data electrode 11 and a scanning electrode 9, respectively.

Further, the surfaces of the upper substrate 1 and the lower substrate 3 opposing the first and second surfaces, respectively, of the substrate sheet 2 were provided with a first common electrode 20 and a second common electrode 21, respectively, which were retained at a reference potential during drive.

Between the upper substrate 1 and the intermediate substrate sheet 2 and between the intermediate substrate sheet 2 and the lower substrate 3, display media M1 and M2 each comprising in mixture a colored liquid 22 and charged and colored electrophoretic particles 23 were disposed and sealed up with sealing members 24.

The description of the process for preparing the display device D10 is supplemented below.

An (upper) surface of a white glass sheet 2B of 300 μm in thickness was coated with a resist film which was then selectively exposed in a pattern of the scanning electrodes 9 and the connecting electrode pads, ect., and a (lower) surface of the glass sheet 2B was coated with a resin film which was then selectively exposed in a pattern of the second display electrodes 5 and the connecting electrode pads, etc. Then, the resist films on both surfaces of the glass sheet 2B were developed to remove the exposed. portions, thereby forming negative patterns.

Then, the glass sheet 2B was bored by a YAC laser to form 20 μm-dia. through-holes 2b at the parts for forming the electrode pads.

Then, both surfaces of the glass sheet 2B were coated with an Al film by sputtering at the exposed parts and inner walls of the through-holes 2b as well as over the remaining resist films.

Then, an electroconductive paste (a resin paste with fine metal particles dispersed therein) was applied by printing over the through-holes 2b and was pushed into the through-holes 2b by a blade while an excess thereof was removed by the blade. Incidentally, an electroconductive paste containing carbon fine particles dispersed therein, or an insulating paste, can be used alternatively. Further, the through-holes can also be filled with such an electroconductive paste supplied through a nozzle or an electrode material by mail plating.

Then, the resist film pattern remaining on the glass sheet 2B were removed from the glass sheet 2B together with a portion of the Al film thereon by lifting-off to leave the Al pattern forming the first display electrodes 4 and the scanning electrodes 9.

Then, portions of the scanning electrodes 9, on which TFTS 6 and 7 were formed and the data electrodes 10 and 11 were disposed in intersection therewith, were surface-anodized into $Al_2O_3$.

Thereafter, an insulating film of $Ta_2O_5$ was formed by sputtering over the electrodes on the upper surface of the glass sheet 2B. (Instead of the sputtering, another method, such as plasma CVD process can also be used. The insulating layer can also be formed of $SiO_2$ or $SiN_x$).

Then, the insulating layer was successively coated with a layer of a(amorphous)-Si and an etching protection film of $SiN_x$ respectively by the plasma CVD process, followed by patterning of the etching protection film. Then, an $n^+a$-Si ohmic layer was formed and islands or a-Si were formed, followed by coating with a sputtered Cr film, which was then patterned into the drain electrodes, the source electrodes, and the first and second date electrodes 10 and 11. Then, the entirety of the upper surface of the glass sheet 2B was coated with an $SiN_x$ film as a passivation film.

Separately, an upper surface of the plastic film 2A of 50 μm in thickness was entirely coated with a resist film, which was then selectively exposed in a pattern of the first display electrodes 4 and connecting electrode pads, etc., followed by development for removal of the exposed portion to form a negative image.

Then, the lower surface of the plastic film 2A was entirely coated with a 0.55 μm-thick adhesive layer 12C of epoxy resin showing little volume shrinkage ("ARALDITE", mfd. by Ciba Co. Ltd.). Then, the plastic film 2A thus treated was aligned with and bonded to the above-treated glass sheet 2A. Thus, the intermediate substrate sheet 2 was almost formed.

Then, through-holes 2a were formed by means or a YAG laser through the plastic film 2A and adhesive resin layer 2C until the electrode pads on the glass sheet 2B were exposed. Then, Al was vapor-deposited and the through-holes 2a were filled with an electroconductive paste, followed by lifting-off of the resist film to leave the first display electrodes 4.

Separately, the upper substrate 1 and the lower substrate 3 each of glass were coated on one surface each thereof with an ITO (indium tin oxide) film, followed by patterning into a common electrode 20 and a common electrode 21, respectively.

Then, these substrates 1, 2 and 3 were applied to each other with a spacing of 50 μm each together with spacers (not shown) disposed therebetween, and the spacings were filled with display media M1 and M2 each comprising white $TiO_2$ particles having an average particle size of 5 μm dispersed with a colored liquid of silicone oil d dyes with a blue dye and sealed up with sealing member 24.

The thus-produced double-face display device D10 is driven in the following manner.

Picture data to be displayed on a first face and picture data to be displayed on a second face are supplied to a picture data processing circuit (not shown) and divided into m×n pixel data for each face.

Then, pixel data of 2n in number including first-face pixel data and second-face pixel data arranged alternately corresponding to the first data electrodes 10 and the second data electrodes 11 were formed for each scanning electrode 9 and stored in a frame memory (not shown).

In this state, the scanning electrode drive circuit supplies a selection signal pulse voltage to a first common scanning electrode 9 and non-selection signal pulse voltages to the other (m−1) common scanning electrodes 9 via a timing circuit (not shown). As a result, all the TFTs 6 and 7 on the selected common scanning electrode 9 are turned on, and all the TFTs 6 and 7 on the other common scanning electrodes 9 are all turned off.

Then, in synchronism with the selection period, data signals corresponding to the first-column common scanning electrode 9 are supplied to the data electrode drive circuit, whereby pixel data are supplied to all the first and second data electrodes 10 and 11. As a result, at pixels along the first-column common scanning electrode 9, electrophoretic particles 23 are moved depending on voltages applied to the display electrodes 4, 5 and the common electrodes 20, 21.

By repeating the above-mentioned drive operation successively for the other common scanning electrodes 9, picture display on each display face is effected.

EXAMPLE 5

Figure 14:
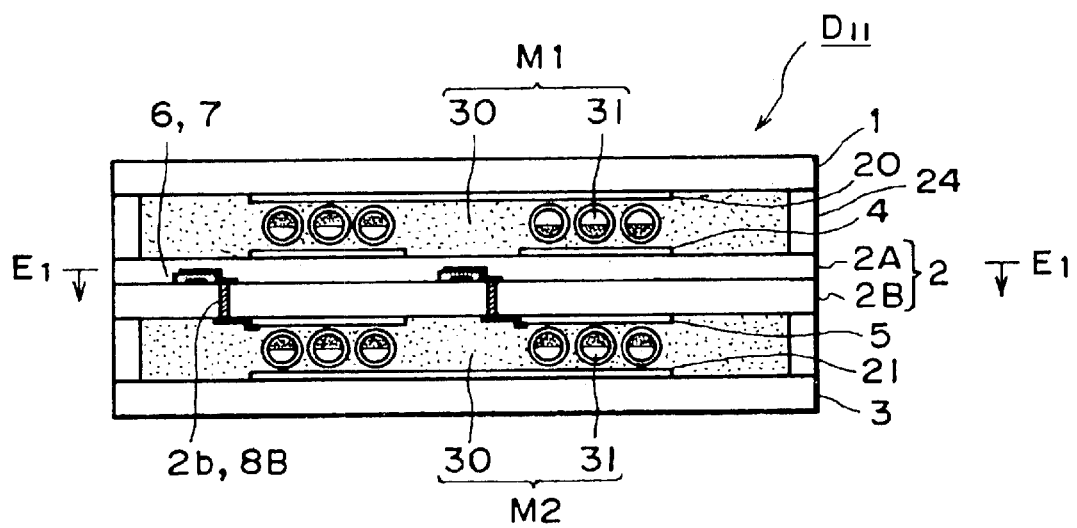

A double-face display device (minute ball twisting type display device) having a structure as illustrated in FIGS. 14 and 15 was prepared.

Figure 15A:
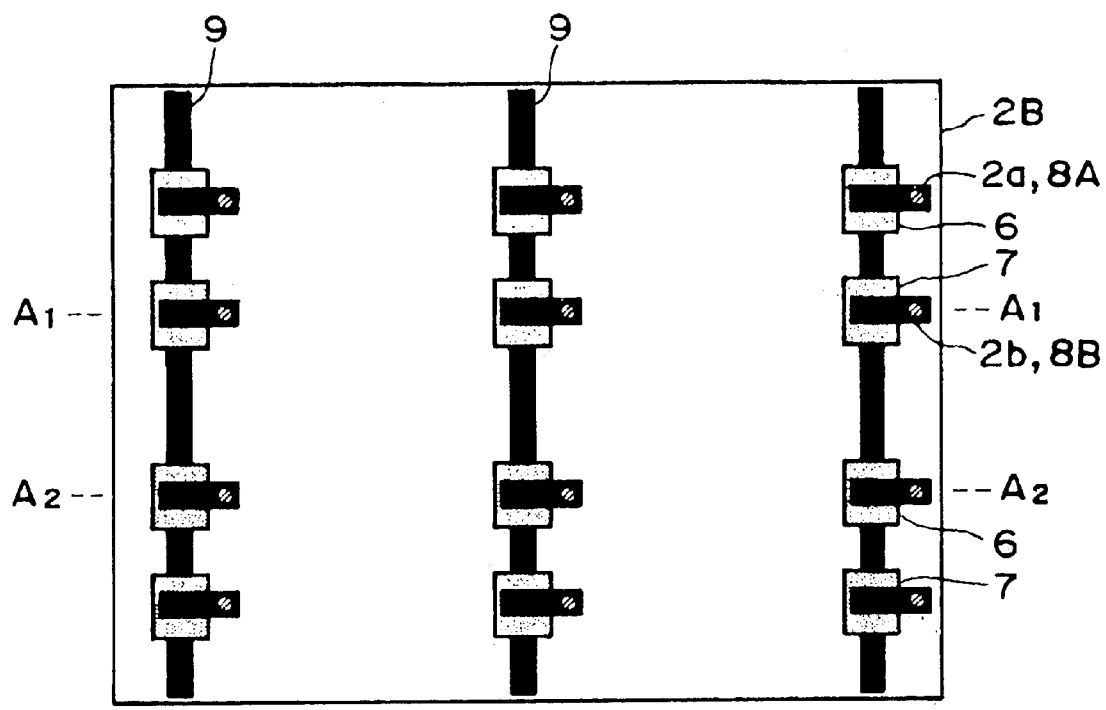
FIGS. 15A–15C and FIGS. 17A–17C are respectively a set of one plan view and two sectional views for devices of FIGS. 14 and 16, respectively.
Figure 15B:
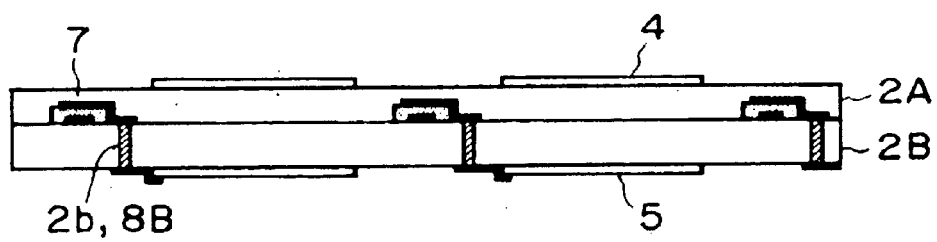
Figure 15C:
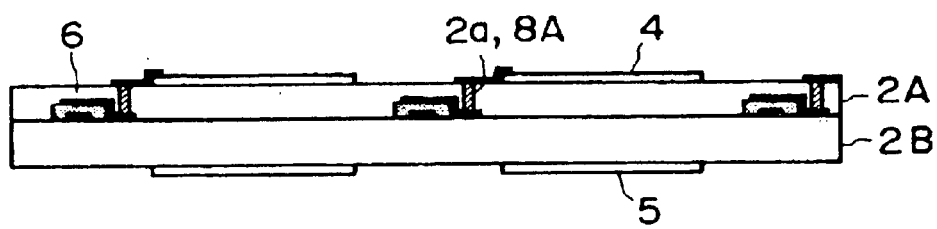

FIG. 14 is a sectional view of double-face display device D11 of this Example. FIG. 15A is a plan view as viewed in a direction of arrows E1—E1 in FIG. 14 for showing a device arrangement over a second (lower) layer sheet 2B; FIGS. 15B and 15C are sectional views of an intermediate substrate sheet 2 including the second layer sheet 2B take along lines A1—A1 and A2—A2, respectively, in FIG. 15A.

More specifically, an intermediate substrate sheet 2 was formed by laminating a layer sheet 2B of white glass sheet similar to the one used in Example 4 with a layer sheet 2A of 200 μm-thick polyethylene terephthalate (PET) film softened under heating. As first and second switching devices, MIM devices 6 and 7 were used. First display electrodes 4, second display electrodes 5 and scanning electrodes 9 were similarly formed as in Example 4. The plastic film 2A and the white glass sheet 2B were provided with through-holes 2a and 2b, respectively, which were filled with connecting electrodes 8A and 8B, respectively, similarly as in Example 4. The MIM devices 6 and the MIM devices 7 were disposed in superposition with the scanning electrodes 9 similarly as the TFT devices 6 and 7 of Example 4. The upper electrodes of the first-face MIM devices 6 were connected via the connecting electrodes 8A to the first display electrodes 4, and the upper electrodes of the second-face MIM devices 7 were connected via the connecting electrodes 8B to the second display electrodes 5.

The first and second substrates 1 and 3 were provided with first and second common electrodes 20 and 21, respectively, which were connected to data electrodes (not shown).

Between the substrates 1, 2 and 3, display media M1 and M2 each comprising a silicone rubber support layer 30 provided with cavities each enclosing a two-color ball 31 therein together with silicone oil as a lubricant for reducing a friction between the cavity wall and the two colored ball.

The other structures of D11 were similar to those of D10 in Example 4.

The description of the process for producing the display device D11 is supplemented below.

Similarly as in Example 4, both surfaces of the glass sheet 2B were coated with a resist film and subjected to pattern exposure. The exposed resist films on both surfaces were developed to form exposed electrode patterns, and through-holes 2b were formed in the glass sheet 2B.

Then, both surfaces of the glass sheet 2B were coated with a tantalum film by sputtering, and the through-holes 2b were filled with an electroconductive paste similarly as in Example 4.

Then, the upper surface of the glass sheet 2B was coated with a resist film, which was then patterned to be selectively removed at portions of the scanning electrodes 9 where the MIM devices 6 and 7 were later formed, and the exposed portions of the scanning electrodes 9 were anodized to form a ca. 60 nm-thick $Ta_2O_x$ film. Then, a Cr film was formed thereover by sputtering and patterned to form the upper electrodes of the MIM devices 6 and 7, to complete the MIM devices 6 and 7. Then, the upper surface provided with the MIM devices was coated with a passivation film similarly as in Example 4.

Then, the plastic film 2A was applied onto the glass sheet 2B. More specifically, the glass sheet 2B was heated to 180–220° C. on a hot plate, and then the plastic film 2A was placed thereon to intimately contact the glass sheet 2B under application of a pressure for ca. 1 min. via a polytetrafluoroethylene plate, followed by gradual cooling and removal of the polytetrafluoroethylene plate. As a result the plastic film 2A was bonded to the glass sheet 2B while retaining a surface planarity thereof.

Then, the surface of the plastic film 2A was coated with a resist film, which was than selectively exposed in a pattern of the first display electrodes 4 and connecting electrode pads, etc., followed by development for removal of the exposed portion to form a negative image. Then, through-holes 2a were formed in the plastic film 2A by means of a YAG laser until the electrode pads of the glass sheet 2B were exposed. Then, Al was vapor-deposited, and the through-holes 2a were filled with an electroconductive paste, followed by lifting-off of the resist film to form the first display electrodes 4 the connecting electrodes pads, and the connecting electrodes 2a.

Separately, the upper substrate 1 and the lower substrate 3 were provided with common electrodes 20 and 21 similarly as in Example 4.

Then, a minute ball rotation-type display device as proposed by N. R. Sheridon, et al (Proc. of the SID, Vol. 118, 3/4, pp. 289–293, 1977) was prepared. More specifically, a silicone rubber paste containing two-color balls of 50 μm in average diameter dispersed therein was applied over the first common electrode 20 and over the second common electrode 21 respectively in a thickness of 100 μm and cured, followed by dipping in silicone oil. As a result, the cured silicone rubber was swollen with the silicone oil, and the two color balls were separated from the silicone rubber 30 to leave a minute gap which was simultaneously filled with the silicone oil. Finally, the substrates 1, 2 and 3 were applied to each other, and the peripheral parts of gaps between the substrates were sealed up with sealing members 24.

The display device D11 prepared in this Example may be driven in a similar manner as in Example 4. Each device is provided with a steep threshold characteristic owing to a nonlinear bilateral diode characteristic of the MIM devices 6 and 7. As a result, MIM diodes for selected pixels on a first column receiving a voltage above the threshold are placed in a low-resistivity on-state, while MIM diodes for non-selected pixels on the first column and the 2nd to m-th columns retain a high-resistivity off-state. As a result, the minute balls 31 at the respective pixels are rotated to prescribed positions depending on given picture data to provide a desired display state. Thereafter, the common scanning electrodes 9 are sequentially selected, and display states are written on both faces line by line for the scanning electrodes 9, to complete picture display on both faces.

EXAMPLE 6

Figure 16:
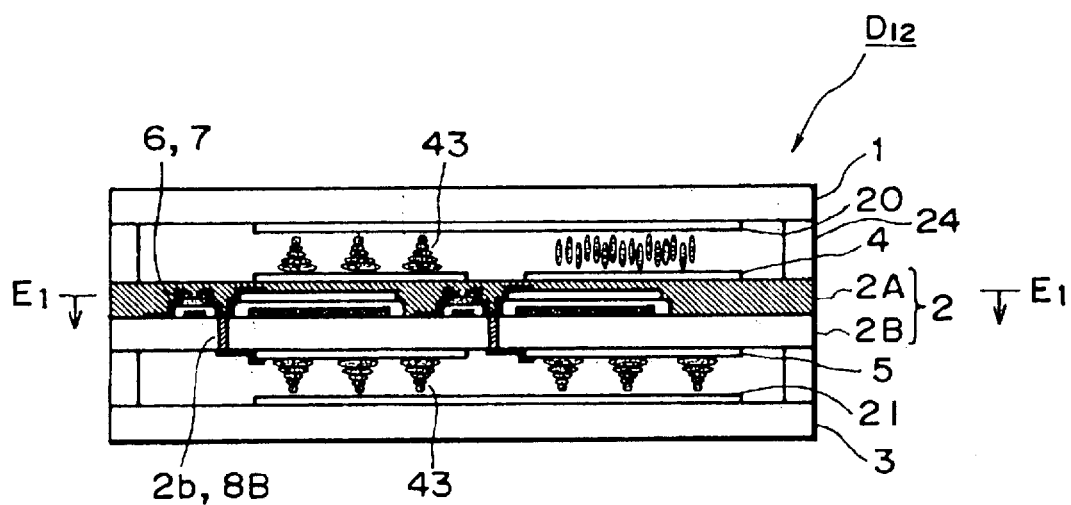

A double-face display device (nematic liquid crystal display device) having a structure as shown in FIGS. 16 and 17 was prepared.

Figure 17A:
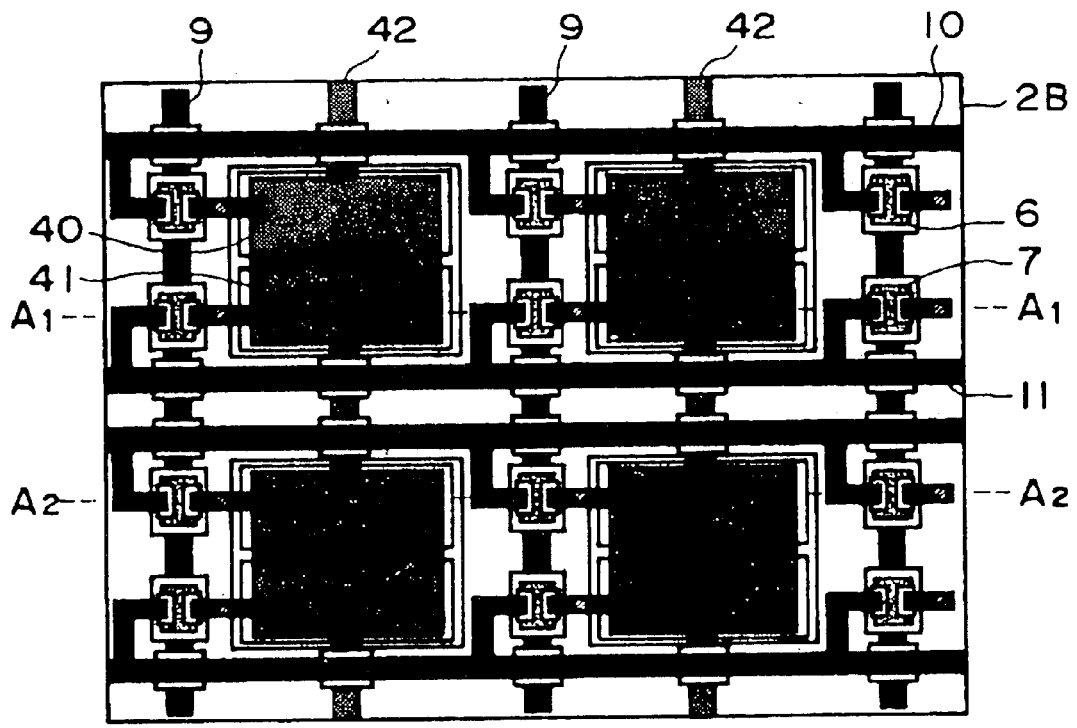
Figure 17B:
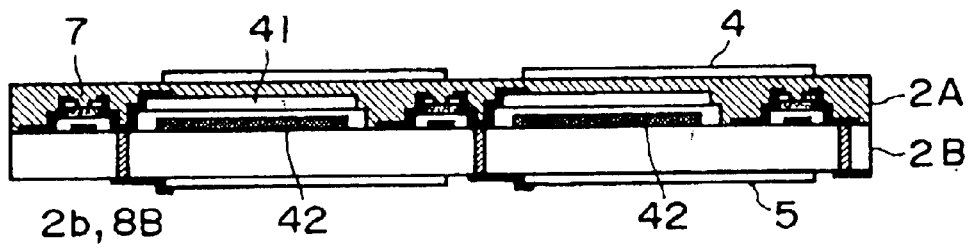
Figure 17C:
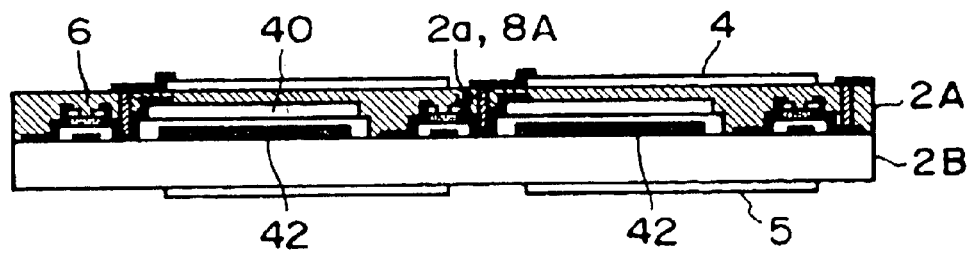

FIG. 16 is a sectional view of double-face display device D12 of this Example, FIG. 17A is a plan view as viewed in a direction of arrows E1—E1 in FIG. 16 for showing a device arrangement over a second (lower) layer sheet 2B; FIGS. 17B and 17C are sectional views of an intermediate substrate sheet 2 including the second layer sheet 23 taken along lines A1—A1 and A2—A2, respectively, in FIG. 17A.

More specifically, an intermediate substrate sheet 2 was formed by coating a layer sheet 2B of white glass sheet similar to the one used in Example 4 with a flattening layer 2A of an ultraviolet-curable resin paste. First-face TFTs 6, second-face TFTs 7, scanning electrodes 9, and first and second data electrodes 10 and 11 were formed on an upper surface of the glass sheet 2B similarly as in Example 4. Further, second display electrodes 5, through-holes 2a and 2b, connecting electrodes 8A and 8B, first and second common electrodes 20 and 21 and second display electrodes 5 were formed of similar materials and in similar manners as in Example 4. However, unlike in Example 4, the upper surface of the glass sheet 2B was further provided with first charge storage capacitances 40, second charge storage capacitances 41 and common electrodes 42 for charge storage capacitances 42 in addition to the above-mentioned first display electrodes 4, etc. Further, the display electrodes 4 and 5 and the common electrodes 20 and 21 were respectively coated with a rubbed alignment control film (not shown). The substrates 1, 2 and 3 were applied to each other while leaving gaps therebetween, which were filled with a nematic liquid crystal (display medium) 43 in a uniformly twisted alignment state.

The other structures were similar to the device D10 in Example 4.

The description of the process for producing the display device D12 is supplemented below.

Similarly as in Example 4, both surfaces of the glass sheet 2B were coated with a resist film and subjected to pattern exposure, followed by development for removal of the exposed portions of the resist film. Regarding the upper surface of the glass sheet 2, portions corresponding to the charge storage capacitances 40 and 41 and the common electrodes 42 for the charge storage capacitances of the resist film were also removed. Then, through-holes 2b were formed in a similar manner as in Example 4.

Further, similarly as in Example 41. Al films were formed on both surfaces of the glass sheet 2B by sputtering, and the through holes 2b were filled with an electroconductive paste.

Then, similarly as in Example 4, the resist films remaining on the glass sheet 2B were removed together with portions of the Al films formed thereon by lifting-off to leave the common scanning electrodes 9, the connecting electrodes 8, the electrode pads, the second display electrodes 5 and the common electrode 42 for charge storage capacitances.

Then, on the upper surface of the glass sheet 2B, an intermediate insulating layer of $SiN_x$ forming a charge storage capacitance and a Cr film forming upper electrodes 40, 41 and wiring electrodes to the connecting electrode pads were formed and patterned by photolithography, sputtering and plasma CVD process.

Thereafter, TFTs 6 and 7 were formed similarly as in Example 4.

Then, the upper surface of the glass sheet 2B carrying the thus-formed TFTs 6 and 7, etc., was coated with a ca. 0.5 to 50 $\mu$m-thick layer of thermosetting acrylic resin ("OPTOMER" SS6699G", made by JSR K.K.) followed by curing by heating at 120° C. for 1 hour to form a flattening layer 2A.

Then, the surface of the flattening layer 2A was coated with a resin film, which was then selectively exposed in a pattern of the first display electrodes and connecting electrode pads, etc., followed by development for removal of the exposed portion to form a negative image. Then, through-holes 2a were formed in the flattening layer 2A. Al was deposited thereon, the through-holes were filled with a resin paste and the resist film was lifted off to leave the first display electrodes 4, connecting electrodes 8A and connecting electrodes in the same manner as in Example 4.

On the other hand, the upper substrate 1 and the lower substrate 3 were provided with common electrodes 20 and 21 in a similar manner as in Example 4 and were further coated with a polyimide alignment film (not shown), followed by rubbing.

These substrates 1, 2 and 3 were applied to each other with gaps each of 10 $\mu$m determined by spacers (not shown) disposed therebetween, and the gaps were filled with a nematic liquid crystal 43 (display medium), followed by sealing of a peripheral part by sealing members.

The double-face display device D5 of this example may be driven in a similar manner as in Example 1.

The disposition of the charge storage capacitances 40 and 41 in this Example is effective to provide an increased time constant of circuit formed by the liquid crystal and the capacitances 40 and 41, thereby delaying the attenuation of voltages applied to the display electrodes 4 and 5 and thus allowing a high contrast display.

The first and second charge storage capacitances are formed on a common surface (upper surface) of the glass sheet 2B, these can be formed through a simple step.

Figure 18A:
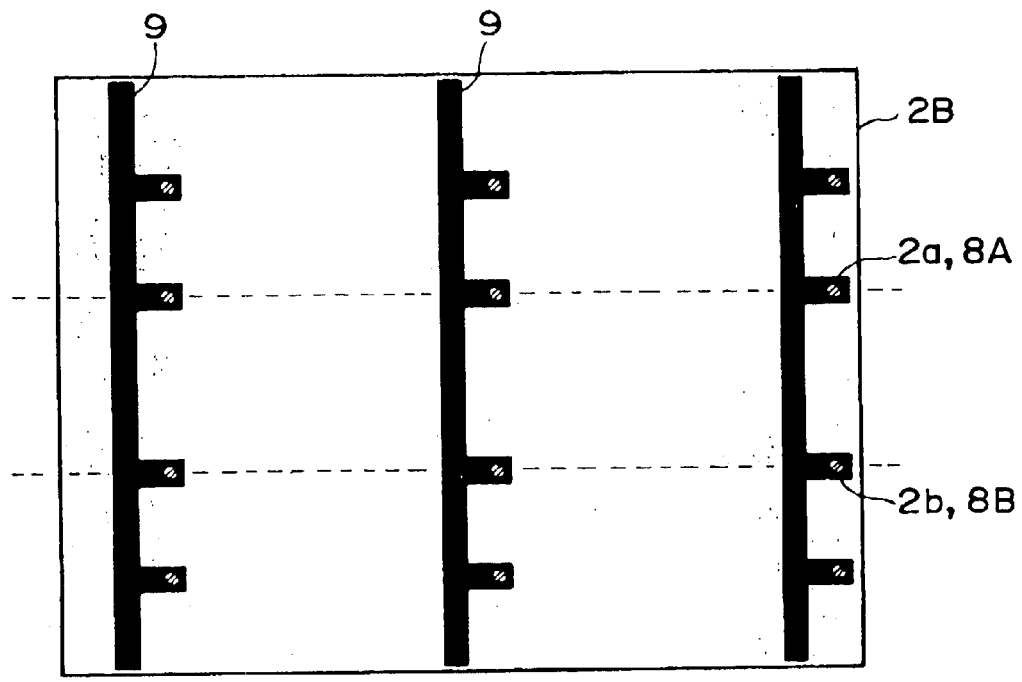
FIGS. 18A–18C are another set of one plan view and two sectional views corresponding to FIGS. 17A–17C showing an embodiment of display device using a simple matrix drive structure.
Figure 18B:
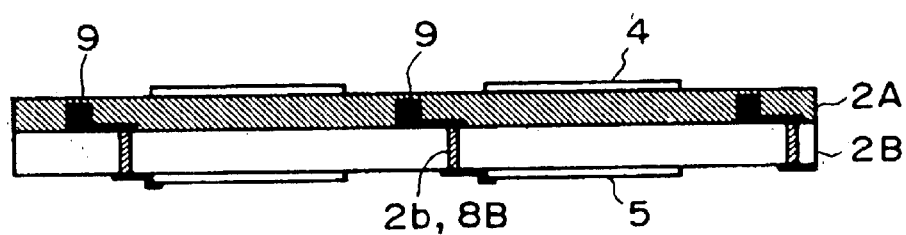
Figure 18C:
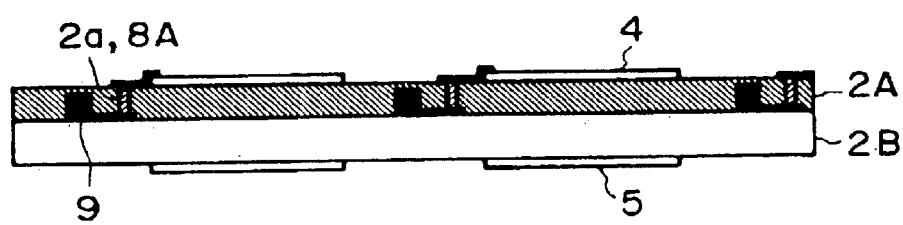

Incidentally, in the above-described examples, an active matrix structure using switching devices was adopted, but it is possible to adopt a simple matrix structure as shown in FIGS. 18A–18C corresponding to FIGS. 12A–12C, FIGS. 15A–15C or FIGS. 17A–17C.

As described above, in the double-face display device according to Second embodiment of the present invention, first-face switching devices and second-face switching devices are both disposed between a first layer sheet and a second layer sheet constituting a laminated substrate sheet, so that the first display electrodes and the second display electrodes disposed along the first and second display media can be individually formed in larger areas without being constrained by the disposition of the first and second switching devices.

Further, if the first and second switching devices are formed on a common surface they can be formed through a single step, so that the production cost can be substantially reduced compared with the case where the production step is repeated twice. Further, as the two types of switching devices can be formed simultaneously, a process damage as encountered in a successive production process for such two types of switching devises can be obviated.

Further, by forming the first and second storage capacitances, or the first and second data surface, a corresponding reduction in production cost can be attained.

Further, by connecting some of the first and second switching devices commonly to a scanning electrodes, a common scanning electrode drive circuit can be used for such first and second switching device. As a result, a device cost can be reduced than in the case of using separate scanning electrode drive circuits for the first and second switching devices, respectively.

What is claimed is:

1. A double-face matrix display device, comprising:

a substrate sheet having a first surface and a second surface, a first display medium disposed over the first surface, a second display medium disposed over the second surface, a scanning electrode along a column of the matrix display device, a first data electrode and a second data electrode each along a row of the matrix display device for supplying display data for driving the first and second display media, respectively, a first display electrode and a second display electrode disposed in association with the first display medium and the second display medium, respectively, and a first switching device connecting the first data electrode and the first display electrode and a second switching device connecting the second data electrode and the second display electrode, wherein the scanning electrode, the first and second data electrodes and the first and second switching devices are disposed on a first common surface within the matrix display device, and the scanning electrode is connected to drive the first switching device and the second switching device commonly.

2. A display device according to claim 1, wherein the first common surface is either one of the first and second surfaces of the substrate sheet.

3. A display device according to claim 2, wherein the first display electrode is disposed together with the first and second switching devices on one of the first and second surfaces, and the second display electrode is disposed on the other of the first and second surfaces, respectively, of the substrate sheet.

4. A display device according to claim 3, wherein a through-hole is formed in the substrate sheet, a connecting electrode is disposed at the through-hole, and the second display electrode is connected to the second switching device via the connecting electrode.

5. A display device according to claim 4, wherein a first charge storage capacitance is connected to the first display electrode, a second charge storage capacitance is connected to the second display electrode, the first and second charge storage capacitances are disposed on a second common surface, and at least one of the first and second charge storage capacitances is connected to the display electrode and the switching device associated therewith via the connecting electrode formed at the through-hole in the substrate sheet.

6. A display device according to claim 5, wherein the second common surface is different from the first common surface.

7. A display device according to claim 6, wherein the first and second charge storage capacitances are formed in regions overlapping with the first and second switching devices, respectively.

8. A display device according to claim 1, wherein the first data electrode is connected to the first switching device, the second data electrode is connected to the second switching device, and the first and second data electrodes are connected to a common data electrode drive control circuit to be supplied with drive voltages.

9. A double-face matrix display device, comprising:
a substrate sheet having a first surface and a second surface,
a first display medium disposed over the first surface,
a second display medium disposed over the second surface,
a scanning electrode along a column of the matrix display device,
a first data electrode and a second data electrode each along a row of the matrix display device for supplying display data for driving the first and second display media, respectively,
a first display electrode and a second display electrode disposed in association with the first display medium and the second display medium, respectively, and
a first switching device connecting the first data electrode and the first display electrode and a second switching device connecting the second data electrode and the second display electrode,
wherein the substrate sheet has a laminated structure including a first layer sheet and a second layer sheet, and
the scanning electrode, the first and second data electrodes and the first and second switching devices are disposed on a first common surface between the first and second layer sheets, and the scanning electrode is connected to drive the first switching device and the second switching device commonly.

10. A display device according to claim 9, wherein
a first through-hole is formed in the first layer sheet, a first connecting electrode is disposed at the first through-hole, and the first display electrode is connected to the first switching device via the first connecting electrode, and
a second through-hole is formed in the second layer sheet, a second connecting electrode is disposed at the second through-hole, and the second display electrode is connected to the second switching device via the second connecting electrode.

11. A display device according to claim 9, wherein a first charge storage capacitance and a second charge capacitance connected to the first and second display electrodes, respectively, are disposed between the first and second layer sheets.

12. A display device according to claim 11, wherein the first and second charge storage capacitances are disposed on a second common surface given by one surface of either one of the first and second layer sheets.

13. A display device according to claim 9, wherein said first display electrode is formed on a surface of the substrate sheet facing the first display medium, and said second display electrode is formed on a surface of the substrate sheet facing the second display medium.

14. A display device according to claim 9, wherein the first and second switching devices are disposed on a second common surface given by one surface of either one of the first and second layer sheets.

15. A display device according to claim 9, wherein one of the first and second layer sheet is formed as a flattening layer.

* * * * *

UNITED STATES PATENT AND TRADEMARK OFFICE
CERTIFICATE OF CORRECTION

PATENT NO. : 6,819,309 B1
DATED : November 16, 2004
INVENTOR(S : Etsuro Kishi

It is certified that error appears in the above-identified patent and that said Letters Patent is hereby corrected as shown below:

Column 4,
Line 18, "display," should read -- display --.
Line 49, "term," should read -- terms, --.

Column 5,
Line 30, "devices 5" should read -- devices 6 --.

Column 6,
Line 34, "on" should read -- one --.
Line 47, "pixel" should read -- pixels --.

Column 7,
Line 4, "region" should read -- regions --.

Column 8,
Line 12, "surfaced" should read -- surfaces --.
Line 16, "Than," should read -- Then, --.

Column 9,
Line 41, "or" should read -- of --.
Line 42, "an" should read -- and --.

Column 10,
Line 6, "50 nm-thick" should read -- 60 nm-thick --.
Line 16, "Sheridan," should read -- Sheridon, --.
Line 24, "runner" should read -- rubber --.

Column 11,
Line 10, "or" should read -- of --.

Column 12,
Line 2, "neouses" should read -- neously --.
Line 7, "device," should read -- devices, --.
Line 38, "electrode" should read -- electrodes --.

Column 13,
Line 49, "of" (first occurrence) should read -- or --.
Line 50, "or" should read -- of --.

UNITED STATES PATENT AND TRADEMARK OFFICE
CERTIFICATE OF CORRECTION

PATENT NO.    : 6,819,309 B1
DATED         : November 16, 2004
INVENTOR(S)   : Etsuro Kishi It is certified that error appears in the above-identified patent and that said Letters Patent is hereby corrected as shown below:

Column 14,
Line 30, "devices" should read -- device --.

Column 16,
Line 41, "or" should read -- of --.
Line 44, "electrode" should read -- electrodes --.
Line 53, "date" should read -- data --.

Column 17,
Line 8, "ect.," should read -- etc., --.
Line 13, "exposed." should read -- exposed --.
Line 15, "YAC" should read -- YAG --.
Line 31, "mail" should read -- metal --.
Line 54, "date" should read -- data --.

Column 18,
Line 19, "d" should be deleted.
Line 58, "Example." should read -- Example, --.

Column 20,
Line 8, "N.R." should read -- N.K. --.
Line 46, "sheet 23" should read -- sheet 2B --.

Column 21,
Line 18, "Example 41." should read -- Example 41, --.

Column 22,
Line 31, "data" should read -- data electrodes and the scanning electrodes, on a common --.
Line 36, "device." (first occurrence) should read -- devices. --.

UNITED STATES PATENT AND TRADEMARK OFFICE
CERTIFICATE OF CORRECTION

PATENT NO. : 6,819,309 B1
DATED : November 16, 2004
INVENTOR(S : Etsuro Kishi

It is certified that error appears in the above-identified patent and that said Letters Patent is hereby corrected as shown below:

Column 24,
Line 29, "change" (second occurrence) should read -- charge storage --.
Line 47, "sheet" should read -- sheets --.

Signed and Sealed this

Third Day of May, 2005

JON W. DUDAS
*Director of the United States Patent and Trademark Office*